(12) United States Patent
Magnusson et al.

(10) Patent No.: US 7,218,817 B2
(45) Date of Patent: May 15, 2007

(54) NONLINEAR OPTICAL GUIDED MODE RESONANCE FILTER

(75) Inventors: Robert Magnusson, Storrs Mansfield, CT (US); Theresa A. Maldonado, College Station, TX (US); Purnomo Priambodo, Arlington, TX (US); Ming Zhou, Arlington, TX (US); Georgeanne Purvinis, Worthington, OH (US); Martin Pomerantz, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 10/858,889

(22) Filed: Jun. 2, 2004

(65) Prior Publication Data
US 2005/0025422 A1  Feb. 3, 2005

Related U.S. Application Data

(60) Provisional application No. 60/474,993, filed on Jun. 2, 2003.

(51) Int. Cl.
*G02B 6/34* (2006.01)
*G02B 6/00* (2006.01)

(52) U.S. Cl. .......................................... 385/37; 385/122
(58) Field of Classification Search ................ 385/37, 385/122, 27
See application file for complete search history.

(56) References Cited

U.S. PATENT DOCUMENTS

| | | | |
|---|---|---|---|
| 4,838,638 A * | 6/1989 | Kamiyama et al. ......... 385/122 |
| 5,216,680 A | 6/1993 | Magnusson et al. .......... 372/20 |
| 5,390,201 A * | 2/1995 | Tomono et al. ............... 372/22 |
| 5,425,848 A * | 6/1995 | Haisma et al. ................ 216/48 |
| 5,598,300 A | 1/1997 | Magnusson et al. ........ 359/566 |
| 5,783,319 A * | 7/1998 | Reisfeld et al. ............. 428/690 |
| 5,887,103 A * | 3/1999 | Jeong et al. ................. 385/122 |
| 5,943,464 A * | 8/1999 | Khodja ....................... 385/122 |
| 6,020,175 A | 2/2000 | Onda et al. ................. 435/180 |
| 6,154,480 A | 11/2000 | Magnusson et al. .......... 372/96 |
| 6,288,206 B1 * | 9/2001 | Stewart et al. .............. 528/201 |
| 6,865,320 B1 * | 3/2005 | Westbrook ................... 385/37 |
| 2001/0026399 A1 * | 10/2001 | Nakabayashi et al. ....... 359/576 |
| 2004/0041082 A1 * | 3/2004 | Harmon .................. 250/214 R |
| 2005/0053974 A1 * | 3/2005 | Lakowicz et al. ............. 435/6 |

OTHER PUBLICATIONS

Blau et al., Second-harmonic generation by counterpropagating surface plasmons at a silver diffraction grating, *Optics Letters*, 1(16)8:1352-1354, 1993.

(Continued)

*Primary Examiner*—Michelle Connelly-Cushwa
*Assistant Examiner*—Tina M. Wong
(74) *Attorney, Agent, or Firm*—Fulbright & Jaworski LLP

(57) ABSTRACT

Nonlinear optical filters and associated methods. In a representative embodiment, a nonlinear optical filter includes a grating and a dye-doped polymer layer coupled to the grating. The dye-doped polymer layer may include ionic self-assembled layers. An associated method includes: providing a nonlinear filter comprising a grating and a dye-doped polymer layer coupled to the grating, directing an input broadband optical wave upon the filter, and backward diffracting the broadband optical wave from the grating as an output narrowband optical wave. The output narrowband optical wave may include a second harmonic beam.

56 Claims, 28 Drawing Sheets

OTHER PUBLICATIONS

Blau et al., "Grating-assisted phase-matched second-harmonic generation from a polymer waveguide," *Optics Letters*, 2(10)0:1101-1103, 1995.

Chen and Simon, "Optical second-harmonic generation with coupled surface plasmons from a multilayer silver-quartz grating," *Optics Letters*, 13(11):1008-1010, 1988.

Cheng and Guo, "Electrostatic self assembly of nanocomposite polymers in grating structures," *J. Vac. Sci. Technol. B*, 19(6):2736-2740, 2001.

Dai et al., "Anomalous-dispersion phase-matched second-harmonic generation in polymer waveguides: chromophores for increased efficiency and ultraviolet stability," *J. Opt. Soc. Am. B.*, 17(3):412-421, 2000.

Dawson et al., "Poly(vinylamine hydrochloride). Synthesis and utilization for the preparation of water-soluble polymeric dyes," *J. Am. Chem. Soc.*, 98(19):5996-6000, 1976.

Dawson, "Polymeric dyes," *Aldrichimica Acta*, 14(2):3-29, 1981.

Decher et al., "Buildup of ultrathin multilayer filbs by a self-assembly process: III. Consecutively alternating adsorption of anionic and cationic polyelectrolytes on charged surfaces," *Thin Solid Films*, 210/211:831-835, 1992.

Gaylord and Moharam, "Analysis and applications of optical diffraction by gratings," *Proc. IEEE*, 73:894-937, 1985.

Heflin et al., "Thickness dependence of second-harmonic generation in thin films fabricated from ionically self-assembled monolayers," *Appl. Phys. Lett.*, 74(4):495-497, 1999.

Hessel and Oliner, "A new theory of Wood's anomalies on optical gratings," *Applied Optics*, 4: 1275-1298, 1965.

Jerphagnon and Kurtz, "Maker fringes : a detailed comparison of theory and experiment for isotropic and uniaxial crystals," *J. Appl. Phys.*, 41:1667-1681, 1970.

Kull et al., "Experimental results of second-harmonic generation from a polyurethane waveguide on a silver grating coupler," *Optics Letters*, 16(24):1930-1932, 1991.

Kuzyk, "Nonlinear optical properties of organic materials X," *SPIE Proceedings*, vol. 3147, 1997.

Li et al., "Growth of monolayered organic films for nanostructured nonlinear photonic devices," *Optical Society of America*, 2002.

Magnusson et al., "Photonic devices enabled by waveguide-mode resonance effects in periodically modulated films," In: *Nano- and Micro-Optics for Information Systems*, Eldada (Ed.), Proc. SPIE 5225:20-34, 2003.

Maker et al., "Effects of dispersion and focusing on the production of optical harmonics," *Phys. Rev. Lett.*, 8(1):21-22, 1962.

Pomerantz et al., "Ionic Self-Assembled Thin Films for Second Order NLO Applications" *Am. Chem. Soc., Div. Polym. Chem.*, 43(2):562-563 (2002).

Priambodo et al., "Fabrication and characterization of high-quality waveguide-mode resonant optical filters," *Applied Physics Letters*, 83(16):3248-3250, 2003.

Purvinis et al, "Second-harmonic generation in resonant waveguide gratings incorporating ionic self-assembled monolayer polymer films," *Optics Letters*, 29(10):1108-1110, 2004.

Purvinis et al., "ISAMs: fabrication and characterization of planar waveguide nonlinear devices," *Optical Society of America*, 2002.

Purvinis et al., "ISAMs: fabrication and characterization of planar waveguide nonlinear devices: CLEO/QELS," The University of Texas at Arlington, 1-15, 2003.

Reinisch et al., "Coupled-mode formalism and linear theory of diffraction for a simplified analysis of second harmonic generation at grating couplers," *Optics Comm.*, 112:339-438, 1994.

Shin et al., "Thin-film optical filters with diffractive elements and waveguides," *Opt. Eng.*, 37:2634-2664, 1998.

Sudduth et al., "Maker fringe measurements of non-poled ionic self-assembled thin films," *Trends in Optics and Photonics Series*, 64:14-19, 2002.

Wang and Magnusson, "Theory and applications of guided-mode resonance filters," *Applied Optics*, 32(14):2606-2613, 1993.

Wang and Magnusson, "Multilayer waveguide-grating filters," *Applied Optics*, 34(14):2414-2420, 1995.

Zhang et al., "Electro-optic property measurements of electrostatically self-assembled ultrathin films," *Optics Communications*, 186:135-141, 2000.

"Ionically self-assembled monolayer (ISAM) process for nanostructured, multilayer thin-film fabrication," www.mdatatechnology.net, printed May 30, 2003.

* cited by examiner cationic

Pyrylium PTOPDT poly{terephthaloyl-4-{4-[N,N-bis(2-oxyethylene)amino]phenyl} -2,6-diphenylpyrylium tetrafluoroborate}

PDDA poly(diallyldimethylammonium chloride)

anionic

Poly S-119

Poly{{sodium 6-hydroxy-5-[(4-vinylsulfamoyl)phenyl)]azo} naphthalene-2-sulfonate}.

PSS poly(sodium 4-styrenesulfonate)

25 bilayers PDDA/Poly A-133 on glass
d31 = N/A pm/V @ 532 nm
d33 = N/A pm/V (no ADPM potential)
Rms roughness = 32 nm 50 bilayers PDDA/Poly S-119 on glass
d31 = <<1 pm/V @ 532 nm
d33 = <<1 pm/V
Rms roughness = 3.7 nm 50 bilayers PDDA/Erioglaucine on glass
d31, d33 decayed over time – suspect the dye diffused into the cationic polymer
Rms roughness = 12 nm
Formed to 140 bilayers!!

NONLINEAR OPTICAL GUIDED MODE RESONANCE FILTER

This patent application claims priority to, and incorporates by reference in its entirety, U.S. provisional patent application Ser. No. 60/474,993 filed on Jun. 2, 2003, entitled, "Nonlinear Optical Guided Mode Resonance Filter."

STATEMENT AS TO RIGHTS TO INVENTIONS MADE UNDER FEDERALLY-SPONSORED RESEARCH AND DEVELOPMENT

Aspects of this invention were made with government support of the Texas Higher Education Coordinating Board, grant numbers 003656-0159-2001 and 003656-0003-2001; National Science Foundation POWRE; and/or NSF Research Experience for Undergraduates. Accordingly, the government may have certain rights in this invention.

BACKGROUND OF THE INVENTION

1. Field of the Invention

The present invention relates generally to optics. More particularly, it concerns optical filters, and even more particularly, nonlinear optical guided mode resonance filters.

2. Description of Related Art

Certain methods of dispersing wave energy are generally known in the art. In particular, spatially periodic elements, such as gratings, have been used to diffract wave energy, e.g., such as light incident on the element. Diffraction gratings can be used to influence the amplitude, phase, direction, polarization, spectral composition, and energy distribution of the electromagnetic wave. Examples of classical applications of gratings include deflection, coupling, filtering, multi-plexing, guiding, and modulation of optical beams in areas such as holography, integrated optics, optical communications, acousto-optics, nonlinear optics, and spectroscopy.

In general, the efficiency of a grating varies smoothly from one wavelength to another. However, there can be localized troughs or ridges in the efficiency curve and these are observed as rapid variations in efficiency with a small change in either wavelength or angular incidence. These troughs or ridges are sometimes called "anomalies." From the point of view of a spectroscopist, anomalies are a nuisance because they introduce various peaks and troughs into the observed spectrum. It is, therefore, very important that the positions and shapes of the anomalies be accurately predicted as well as the conditions under which they appear. However, as the present invention indicates, these "anomalies" may be employed to carry out some very useful purposes.

Guided-mode resonance effects in waveguide gratings generate sharp variations in the intensity of the observable propagating waves. This resonance results from evanescent diffracted waves that are parametrically near to a corresponding leaky mode of the waveguide grating. Because the propagating and evanescent diffracted waves of gratings are both coupled to the adjacent orders, a resonance in an evanescent wave can cause a redistribution of the energy in propagating waves. For high-efficiency resonance effects, the grating filters can be designed to admit only zero-order forward- and backward-propagating waves with primary contributions from the +1 and/or −1 order evanescent-wave resonances. At resonance, the diffraction efficiency of the forward-propagating wave approaches zero, and that of the backward wave tends to unity. Features of this guided-mode resonance effect, such as high-energy efficiency and narrow linewidth, may lead to applications in laser filtering technology, integrated optics, and photonics.

In 1965, Hessel and Oliner presented a mathematical model that analyzed reflection anomalies occurring at both the resonance and the Rayleigh wavelengths for a given equivalent surface reactance. Since then, others have studied grating anomalies and resonance phenomena on surface-relief gratings and corrugated dielectric waveguides. Many potential applications based on the narrow-line reflection filter behavior of the fundamental, planar waveguide grating structure have been described.

Although showing a degree of usefulness, conventional nonlinear resonance filters suffer from several drawbacks. One drawback is that the fabrication of such filters is typically not easy, quick, and inexpensive. Accordingly, more robust fabrication techniques would be advantageous.

This shortcoming of conventional methodologies—fabrication shortcomings—are not intended to be exhaustive, but rather are among many that tend to impair the effectiveness of previously known techniques concerning nonlinear resonance filters. Other noteworthy problems may also exist (e.g., an inability to fabricate on the nanoscale the nonlinear material conformal to a grating structure); however, those mentioned here are sufficient to demonstrate that methodology appearing in the art have not been altogether satisfactory and that a significant need exists for the techniques described and claimed in this disclosure.

SUMMARY OF THE INVENTION

Shortcomings of the prior art are reduced or eliminated by techniques disclosed herein. These techniques are applicable to a vast number of applications including many application requiring optical filters. For instance, the techniques may be applied to: telecommunications systems, modulators, second order nonlinear optical all-optical switches, tunable lasers, tunable wavelength converters, ultra-narrowband filters with multiple lines for spectrometers and many other similar instruments, etc.

In a broad sense, this invention covers, among other things, optical filters having a nonlinear organic film coating on a grating. Using techniques of this disclosure, one may provide a nonlinear optical filter including a dye-doped polymer layer, which is easy, quick, and relatively inexpensive to fabricate. In a representative but non-limiting embodiment, the dye-doped polymer layer is made up of ionic self-assembled layers.

In one embodiment, the invention involves an optical filter including an optical waveguide grating and one or more nonlinear layers. The one or more nonlinear layers are coupled to the grating and any one of the nonlinear layers can include: a dye-containing polymer, a dye-doped polymer, or a dye not associated with a polymer in a layer. The optical waveguide grating has an appropriate periodicity to generate a leaky waveguide mode, and this leaky mode interacts with the one or more nonlinear layers to produce frequency converted output light (e.g., a second-harmonic generation, SHG, output) for a given input optical beam excitation. The dye-containing, dye-doped polymer, or dye not associated with a polymer layer may include ionic self-assembled layers or non-ionic layers.

In another embodiment, the invention involves a nonlinear optical filter including a grating and a dye-doped polymer layer coupled to the grating. As used herein, "doped" encompasses physical mixture(s) as well as bonding. For example, "dye-doped polymer" encompasses, among other things, a dye chemically bonded to a polymer or dye molecule(s) dissolved in a polymer matrix. In other words, "dye-doped polymer" can be interpreted to simply mean "dye containing polymer."

The dye-doped polymer layer may include ionic self-assembled layers. The grating may include a semiconducting material. The grating may include silicon. The grating may include gallium arsenide. The grating may include a dielectric material. The grating may include silicon dioxide. The dye-doped polymer layer may be on the grating. The filter may also include one or more substrate layers coupled to the grating. At least one of the substrate layers may include hafnium dioxide.

In another embodiment, the invention involves a nonlinear optical filter that includes a substrate, a grating, and a dye-doped polymer layer between the substrate and the grating.

In another embodiment, the invention involves nonlinear optical filter including a hafnium dioxide layer, a silicon dioxide layer on the hafnium dioxide layer, a silicon dioxide grating on the silicon dioxide layer, and a dye-doped polymer layer coupled to the grating.

The filter may include a fused silica layer below the hafnium dioxide layer. The hafnium dioxide layer may be about 100 nm, the silicon dioxide layer may be about 20 nm, the silicon dioxide grating may be about 145 nm and the have a filling factor of about 0.5, and the ionic self-assembled layers may be about 90 nm and include about 40 bilayers.

In another embodiment, the invention involves a nonlinear optical filter including a dye-doped polymer layer, a silicon dioxide layer on the dye-doped polymer layer, and a silicon dioxide grating on the silicon dioxide layer. The ionic self-assembled layers may be about 270 nm and include about 130 bilayers.

In another embodiment, the invention involves a method for nonlinear filtering. A nonlinear filter including a grating and a dye-doped polymer layer coupled to the grating is provided. Incident light is directed onto the filter, and filtered light from the filter is collected.

In another embodiment, the invention involves a method. A nonlinear filter including a grating and a dye-doped polymer layer coupled to the grating is provided. An input broadband optical wave is directed upon the filter. The broadband optical wave is backwards-diffracted from the grating as an output narrowband optical wave. The output narrowband optical wave may include a second harmonic beam.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
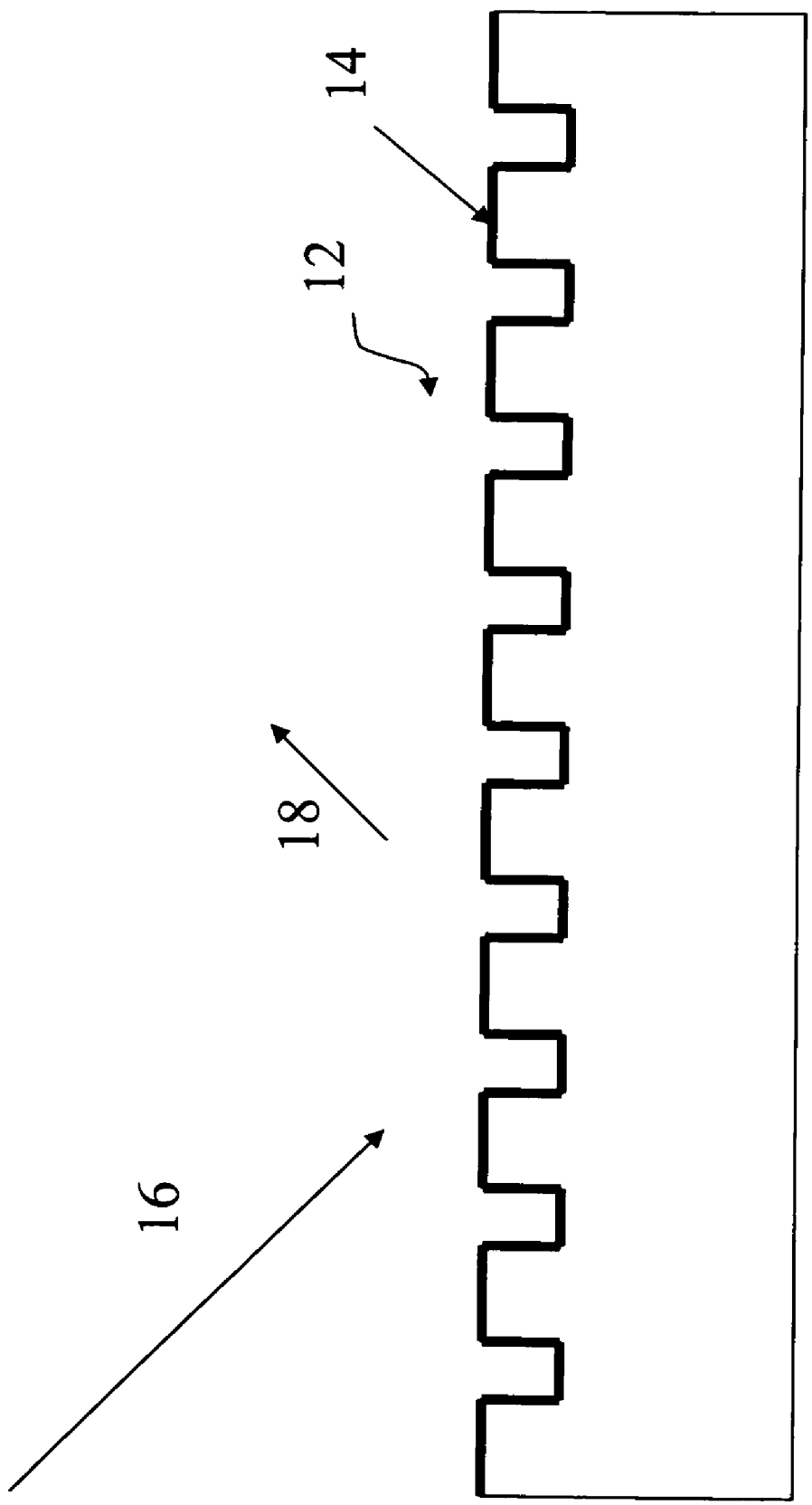
FIG. 1 is a nonlinear optical filter, in accordance with aspects of the invention.

Depositing dye-doped polymers one molecular monolayer at a time on periodic (grating) structures (i.e., diffractive optical elements) provides an opportunity to build a new class of photonic devices (lasers, switches, modulators, etc.) at the nanoscale. In addition to reducing the length-scale of important photonic devices, functionality can be demonstrated and utilized that is not achievable in conventional systems.

The nonlinear optical guided mode resonance filter (GMRF), for example, is a key element for several devices. Using the techniques of this disclosure, one can demonstrate, use, and quantify ultra-narrowband wavelength and angular spectra. One of several commercial uses involves a tunable wavelength converter of low power sources (laser diodes). There are a host of other potential applications for techniques of this disclosure, as will be understood by those having ordinary skill in the art.

Techniques of this Disclosure Advantageously Allow for, Among Other Things:

1. The deposition of ionic self-assembled monolayers (ISAM) of dye-doped polymers onto an inorganic structure of semiconducting and dielectric layers;

2. Obtaining an ultra-narrowband angular spectral signature of a second harmonic beam; and 3. Utilizing nonlinear optical guided mode resonance phenomena in a nonmetallic structure.

Other Advantages Associated with Techniques of this Disclosure Include:

4. Resonant waveguide structures provide a means of concentrating power in a nonlinear material.

5. ISAM films have large polarizability due to delocalized pi electrons, resulting in large nonlinear and electro-optic effects.

6. Film thickness and optical properties are controllable to nanoscale. Deposition on gratings possible.

7. Films are simple and economically attractive to fabricate. Common solvents used (methanol and water).

8. Using guided mode resonance effect in conjunction with ISAM films demonstrates enhanced chi-squared nonlinear effects.

Using the techniques of this disclosure, one can develop photonic devices by integration of finely patterned dielectric and semiconductor materials with organic materials. Diffractive optical elements (DOE) with nanoscale, periodic, spatial features enable new capability to control and guide light. The inventors have designed, fabricated, and characterized such optical elements containing resonant waveguide gratings. Dry-etched silicon dioxide gratings on hafnium dioxide waveguide films were made with features as small as 90 nm, enabled by precision laser interference recording approach. The filling factor and the depth of the diffractive elements can thus be controlled on a nanoscale. To produce a nonlinear frequency conversion, polymeric chromophore films exhibiting anomalous dispersion were fabricated and characterized. To examine the ionic self-assembly technique for depositing chromophore films in the fabrication of resonant waveguide grating wavelength converters, an atomic force microscopy (AFM) study of ISAM films on thermal $SiO_2$ gratings with periodicities of several micrometers was carried out. Effects of surface preparation, solution concentration, and film thickness on ISAM film roughness were investigated. It was found that saturated solutions produce rough ISAM films, but appropriately diluted solutions lead to much smoother films. On successful fabrication of quality ISAM films, these can be deposited on the DOE to realize the nonlinear optical conversion.

Using the techniques of this disclosure, one may develop a "bottom-up" fabrication capability that is easy, quick, and inexpensive for producing robust organic thin films and patterned structures designed with tailored optical properties and nanoscale features. The approach, in one set of embodiments, is based on an ionic self-assembled monolayer (ISAM) technique, also called electrostatic self-assembly and alternating polyelectrolyte deposition. This enables the development of important optical devices for applications such as telecommunications (e.g., all-optical switching). It also provides the ability to demonstrate nonlinear optical (NLO) processes such as frequency conversion, cascading, quasi-phase matching, and others that are not as efficient, or not even possible, in inorganic materials. This capability is also important for fabricating diffractive optical elements with tailored properties, e.g., ultra-narrowband filters and tuning elements for lasers.

Turning now to the figures, FIG. 1 illustrates a nonlinear optical filter in accordance with different embodiments. The filter includes a grating 12 and a layer 14. In a generalized embodiment, layer 14 can be an organic film coating. In another embodiment, layer 14 can be a dye-doped polymer layer. In the illustrated embodiment, layer 14 is directly on top of grating 12. In other embodiments, however, layer 14 (e.g., a dye-doped polymer layer) may be simply coupled to grating 12. In that event, one or more additional layers can be between grating 12 and layer 14. In a representative embodiment, layer 14 includes ionic self assembled layers deposited by techniques known in the art. Grating 12 may be of any suitable material known in the art, and in different embodiments may include, but is not limited to, semiconducting material (e.g., silicon, gallium arsenide) or dielectric material (e.g., silicon dioxide). Although not shown in FIG. 1, one or more substrate layers can be coupled to grating 12. For instance, grating 12 may sit on a fused silica substrate.

Arrow 16 of FIG. 1 depicts incident light being directed onto the filter, and arrow 18 depicts filtered light collected from the filter. In one embodiment, arrow 16 can represent an input broadband optical wave, and arrow 18 can result from the backward diffracting of the broadband optical wave to form an output narrowband optical wave. The output narrowband optical wave can be a second harmonic beam.

Figure 2:
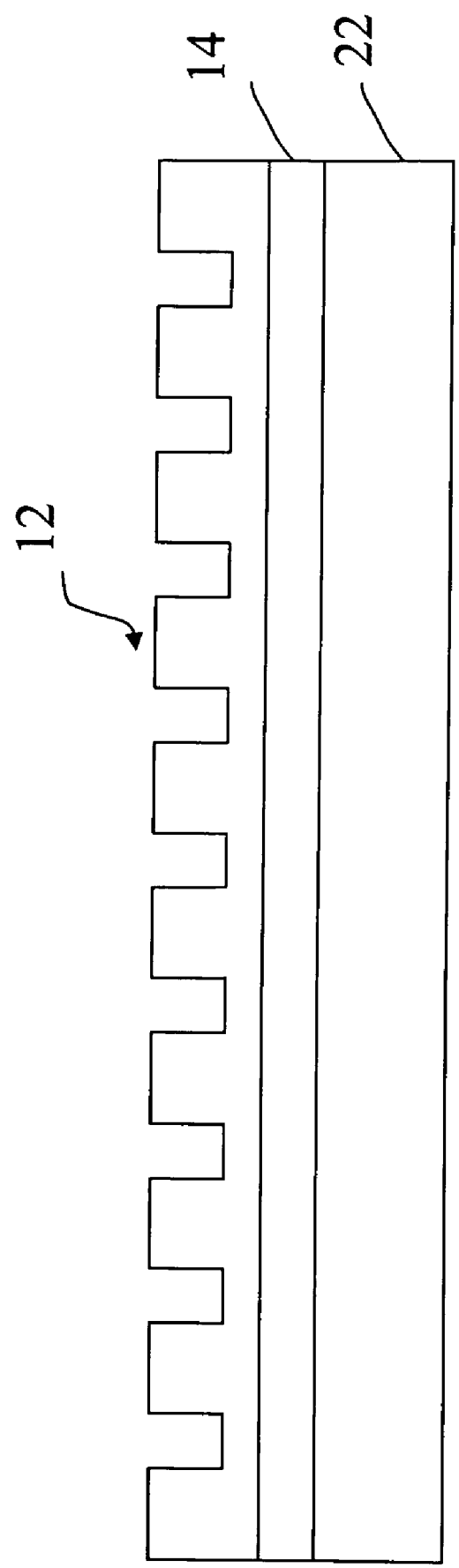
FIG. 2 is another nonlinear optical filter, in accordance with aspects of the invention.

FIG. 2 illustrates another nonlinear optical filter, in accordance with different embodiments. The filter of FIG. 2 includes a substrate 22, a layer 14 (e.g., a dye-doped polymer layer), and a grating 12. As is illustrated, the layer 14 of this embodiment is between substrate 22 and grating 12. Although shown directly between those two structures, layer 14 may be separated from the grating 12/substrate 22 by one or more additional layers.

Figure 3:
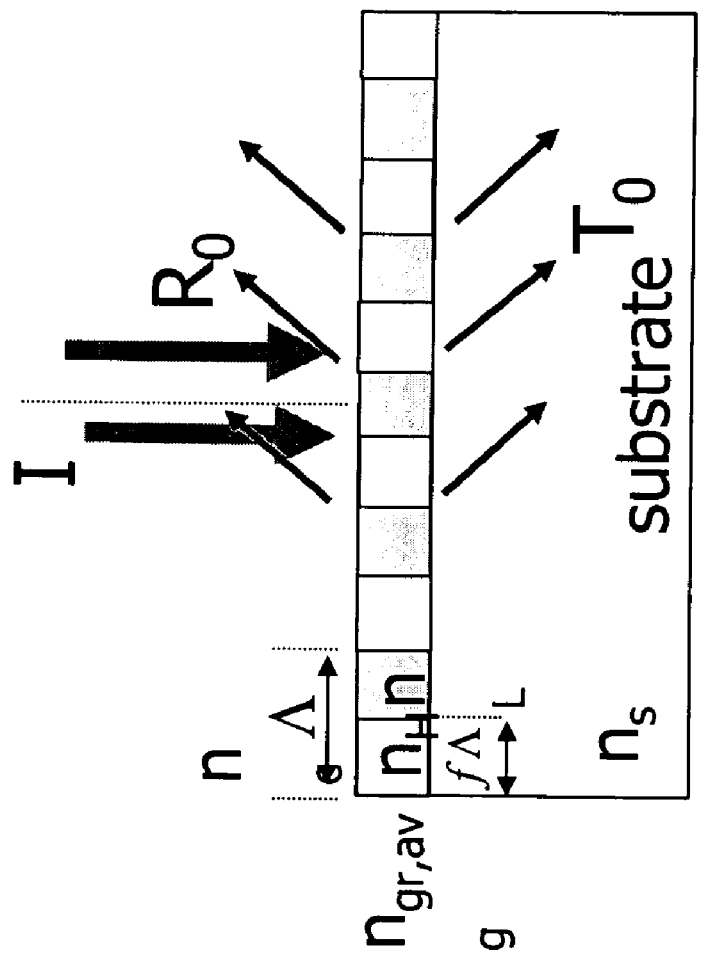
FIGS. 3 and 4 illustrate properties of linear guided mode resonance filters, in accordance with aspects of the invention.
Figure 4:
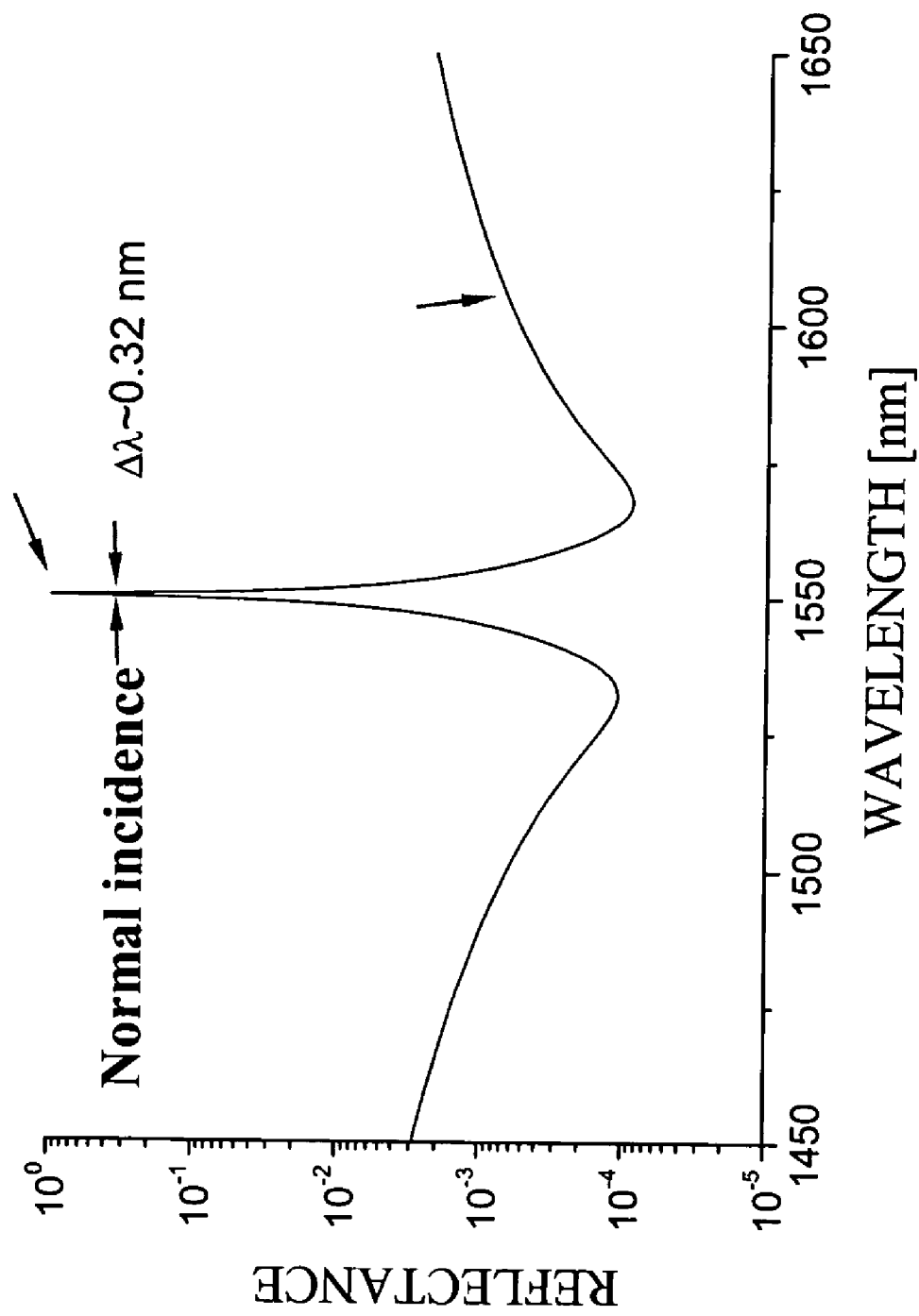

FIGS. 3 and 4 illustrate properties of linear guided mode resonance filters, in accordance with aspects of the invention. General properties of guided mode resonance filters include, but are not limited to: narrow linewidth (e.g., sub nanometer) filter with high efficiency; low sidebands and symmetrical lineshape using antireflection (AR) design; and simple structure (e.g., few thin-film layers).

The structure of FIG. 3 creates narrow spectral width reflection (transmission) filter with very few layers (unlike other thin film filters). When the structure is illuminated by an incident beam, part of the beam is directly transmitted and part is diffracted and subsequently trapped in the waveguide layer. Some of the trapped light is then redirected outwards, so that it interferes destructively with the transmitted part of the beam. At particular wavelength and angle of incidence of the incident beam, the structure "resonates" as complete interference occurs and no light is transmitted.

Figure 5:
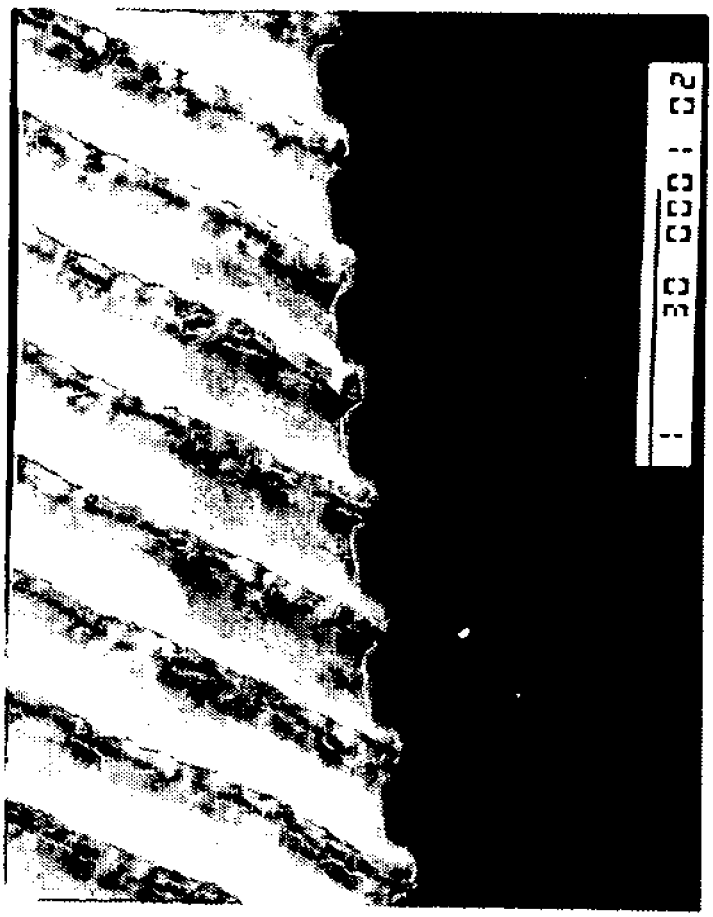
FIGS. 5 and 6 depict a filter and illustrate example spectral filter response, respectively, in accordance with aspects of the invention.
Figure 6:
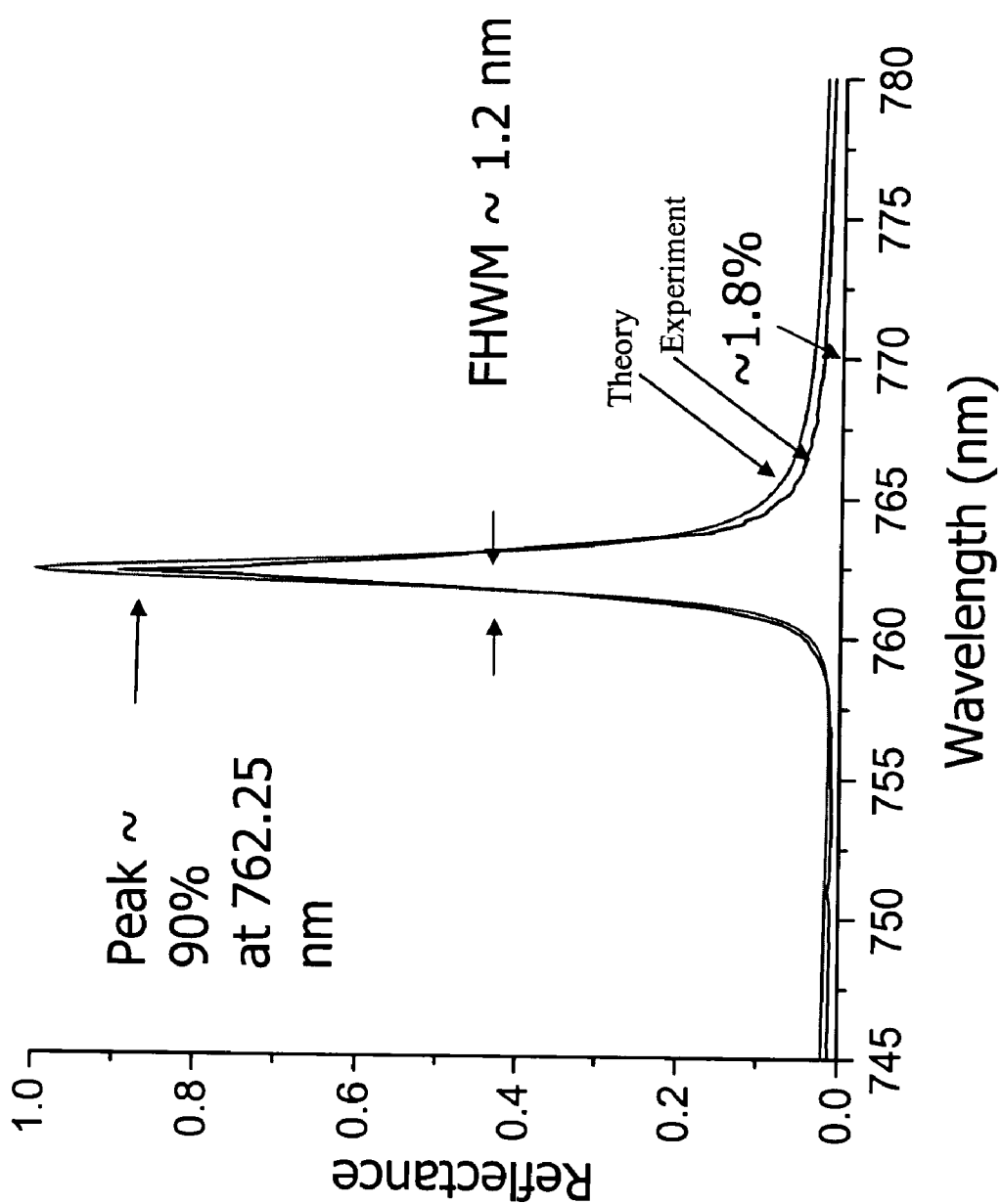

FIGS. 5 and 6 depict a filter and illustrate example spectral filter response, respectively, in accordance with aspects of the invention. The following data is associated with FIG. 5: normal incidence, TE polarization; grating period=444.4 nm; grating thickness=110 nm; filling-factor=58%; waveguide thickness=202 nm. A rectangular grating was assumed for theoretical fitting.

Figure 7:
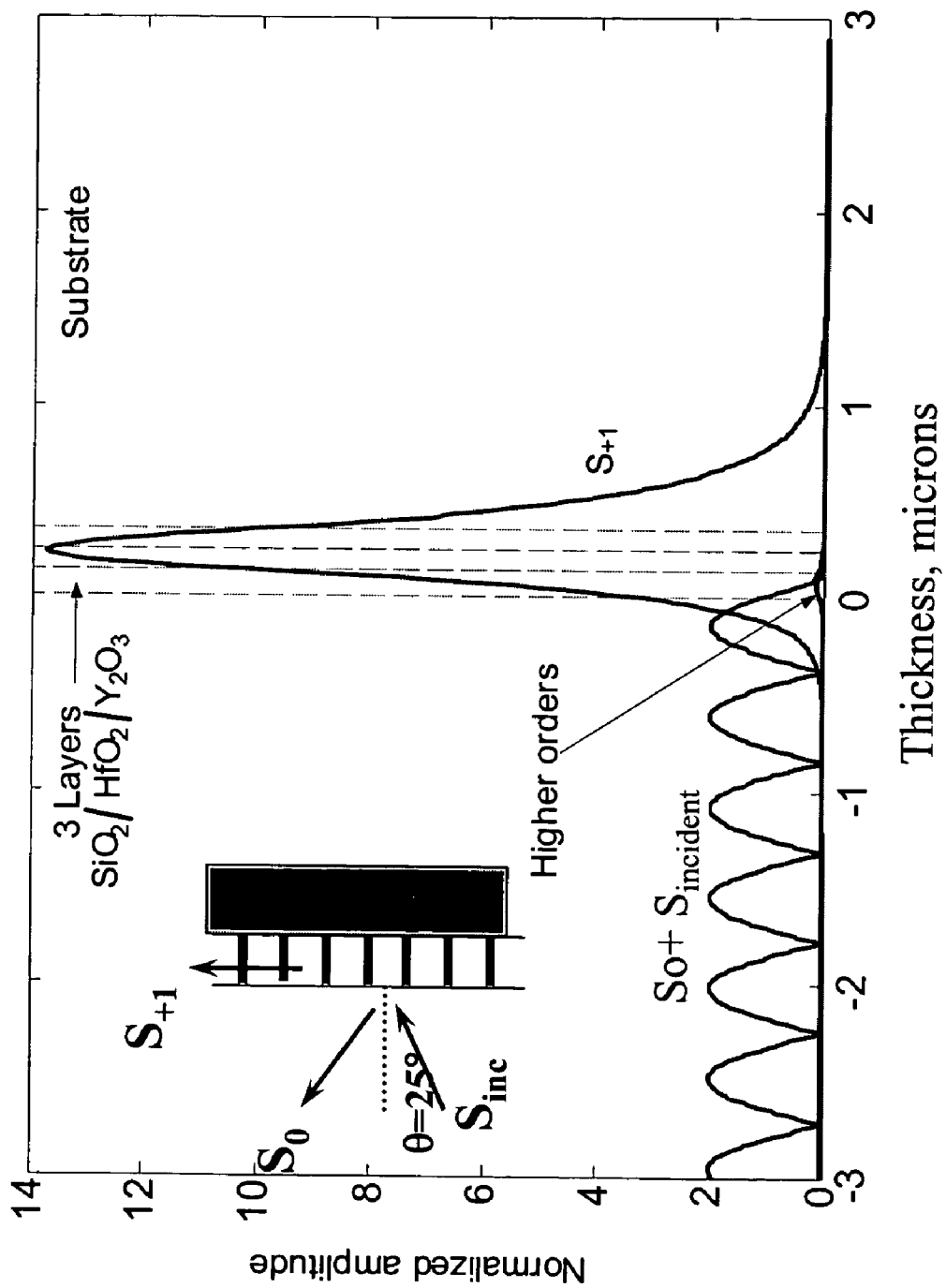
FIG. 7 illustrates an amplitude profile of a leaky mode, in accordance with aspects of the invention.

FIG. 7 illustrates an amplitude profile of a leaky mode, in accordance with aspects of the invention.

Figure 8:
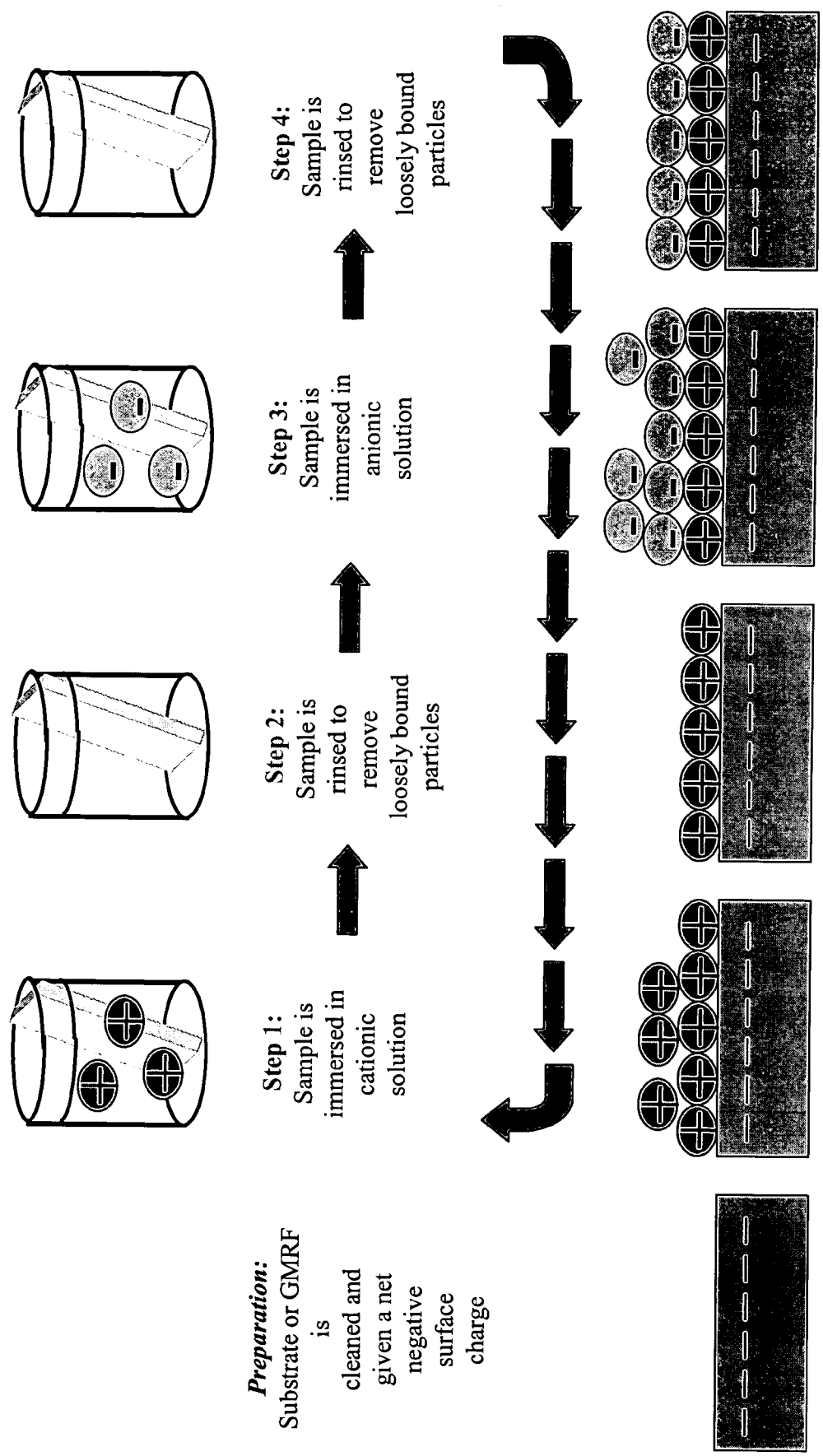
FIG. 8 illustrates an exemplary method for fabricating ionic self-assembled monolayer (ISAM) layers, in accordance with aspects of the invention.
Figure 9A:
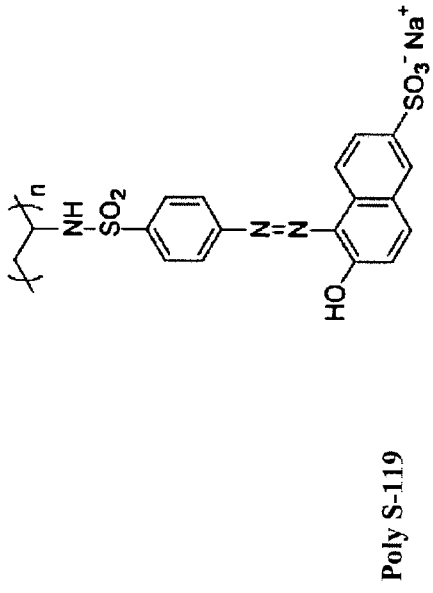
FIGS. 9A–9C illustrate materials for fabricating ionic self-assembled layers, in accordance with aspects of the invention.
Figure 9A:
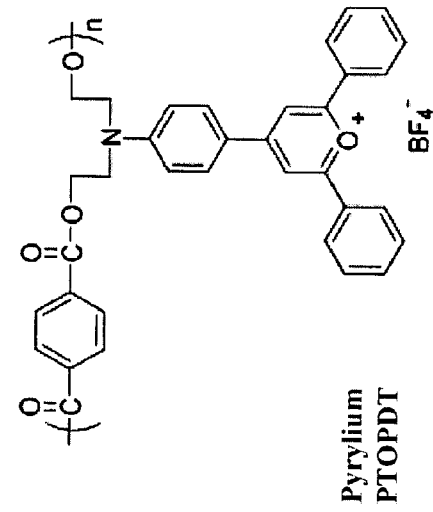
Figure 9A:
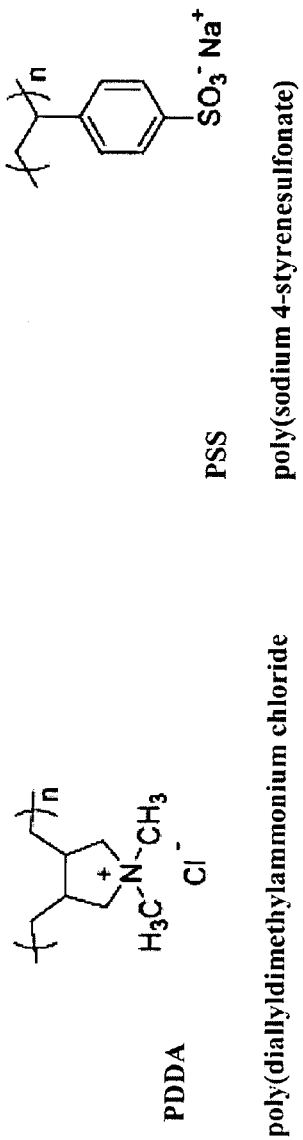
Figure 9B:
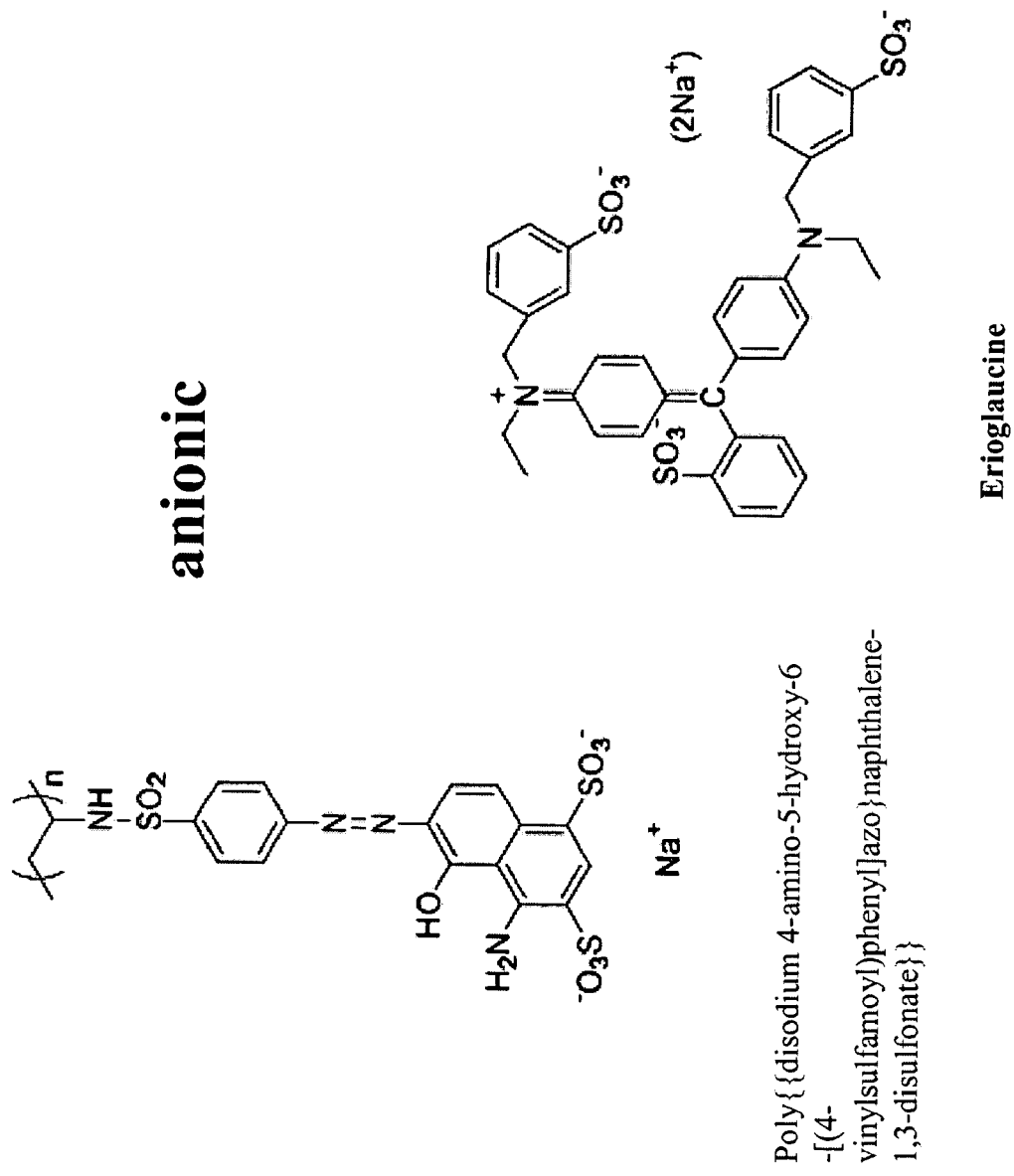
Figure 9C:
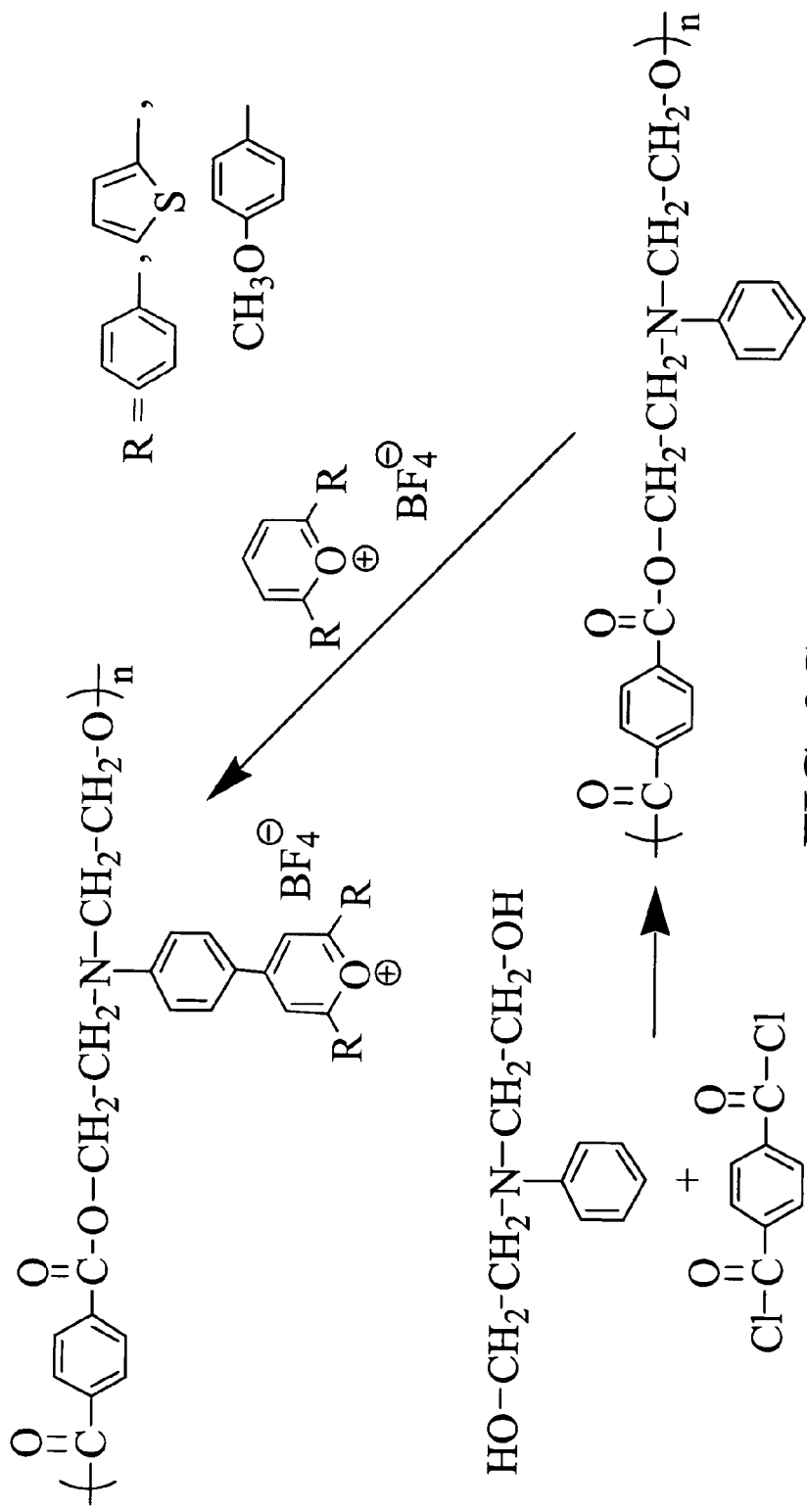
Figures 10A, 10B, 10C:
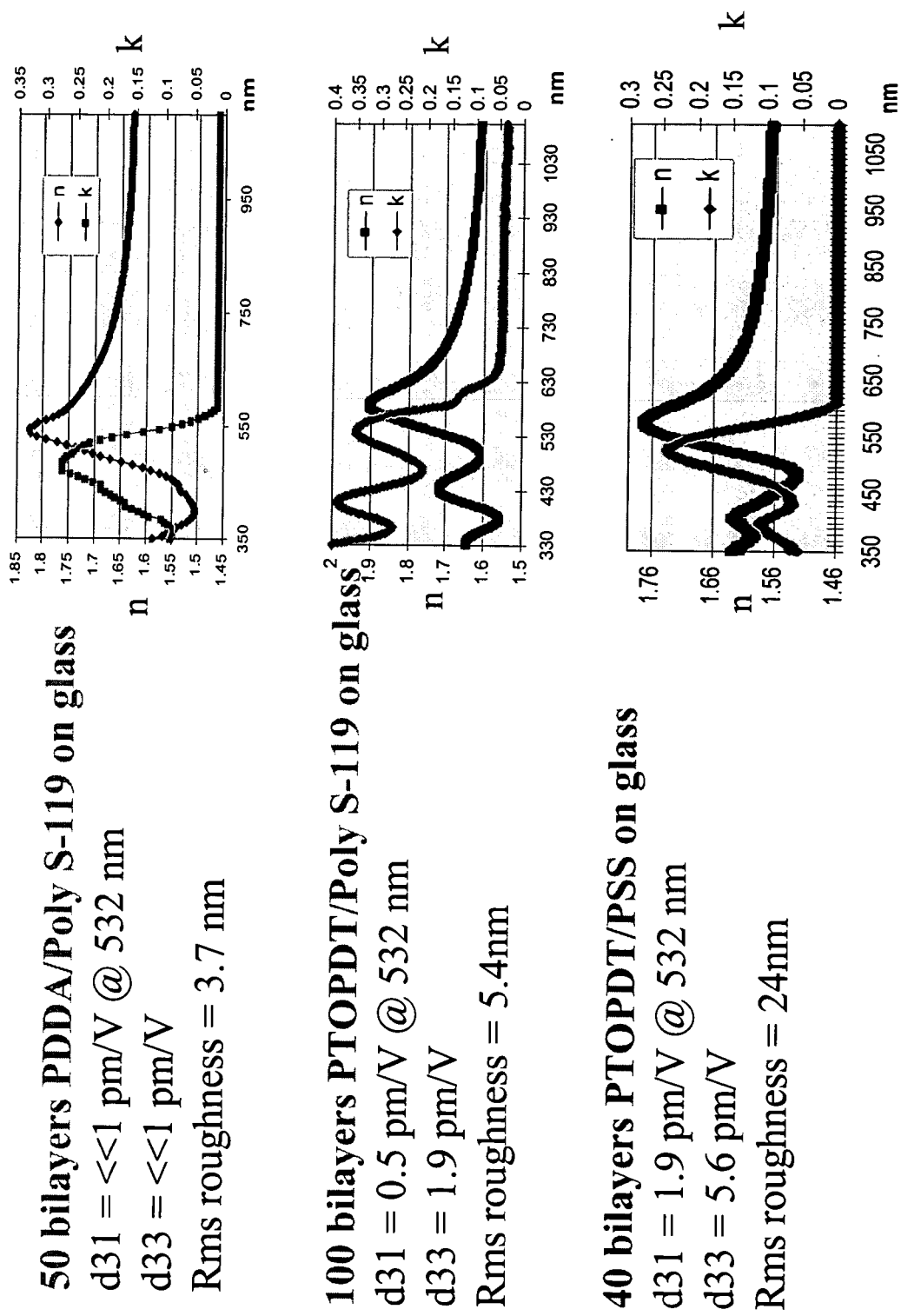
FIGS. 10A–10G illustrate characterization data for various cationic/anionic combinations on flat substrates, in accordance with aspects of the invention.
Figure 10D:
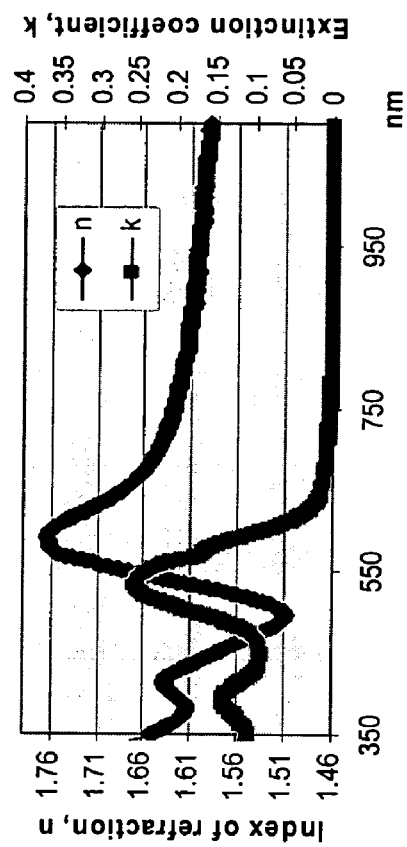
Figure 10E:
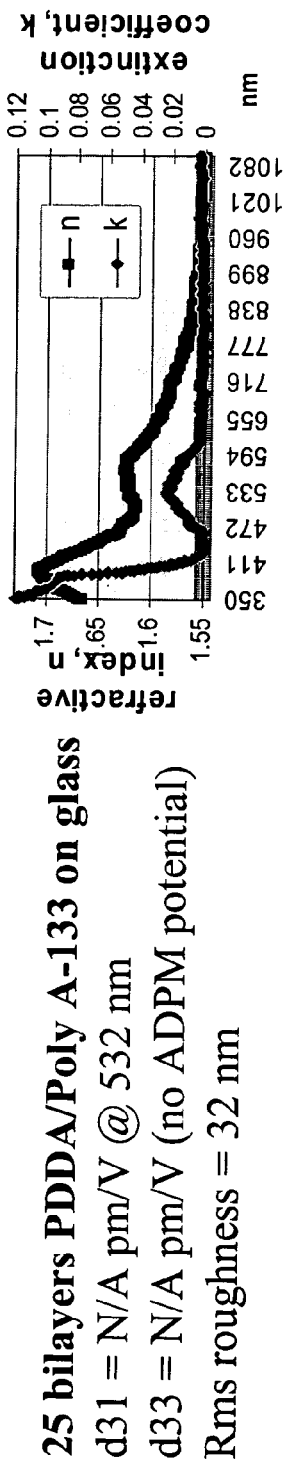
Figure 10F:
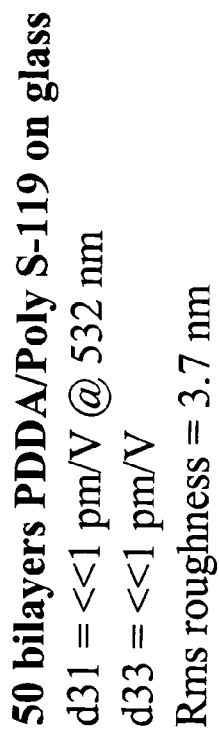
Figure 10G:
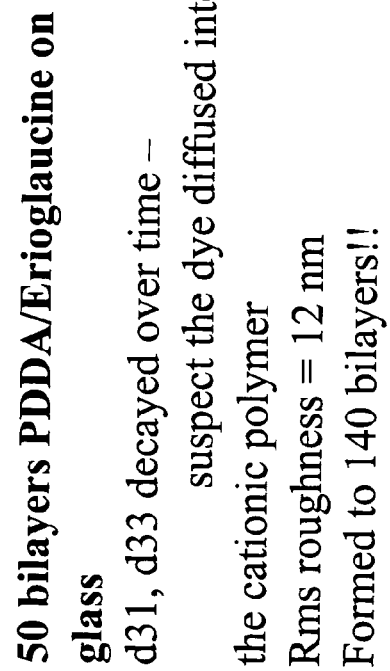

FIG. 8 illustrates an example of a method for fabricating ionic self-assembled monolayer (ISAM) layers, in accordance with aspects of the invention. Particularly, the method provides a preparation step which includes cleaning a substrate or a GMRF and setting a net negative surface charge for the substrate or GMRF. Next, the sample is subjected to a cationic solution and may subsequently be rinsed to remove any loosely bound particles. Next, the sample is subjected to an anionic solution and any loosely bound particles may be removed in a rinsing step. The method may also provide a repeating step, which allows multi-layers to be formed. Examples of cationic and anionic solutions used for fabricating ionic self-assembled layers, in accordance with aspects of the invention are shown in FIGS. 9A–9C. FIGS. 10A–10G illustrate characterization data for various cationic/anionic combinations on flat substrates, in accordance with aspects of the invention.

Alternatively, in one embodiment, the substrate or GMRF may be cleaned and may have a net positive surface charge. The sample may subsequently be subjected to an anionic solution followed by a subjection to a cationic solution. A rinsing step may be provided for the sample before and after the subjection to the cationic solution.

Figure 11:
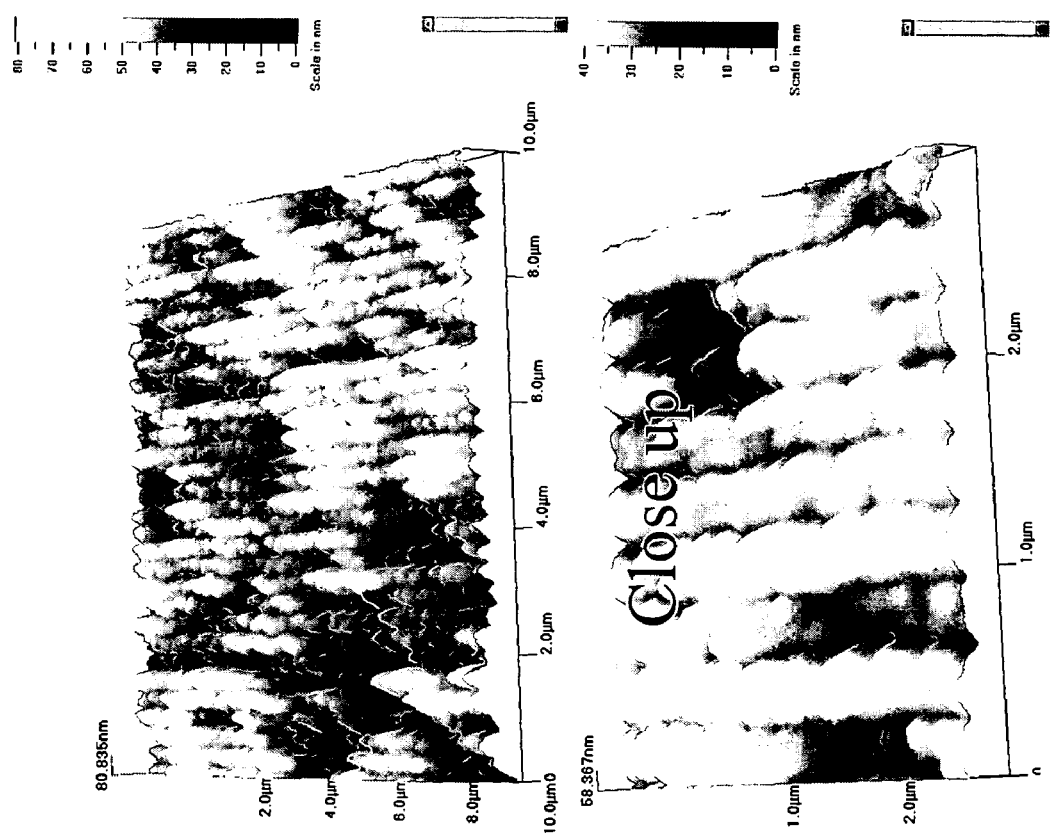
FIGS. 11 and 12 illustrate 10 bilayers PTOPDT-Poly S-119 on a guided mode resonance filter (GMRF), in accordance with aspects of the invention.
Figure 12:
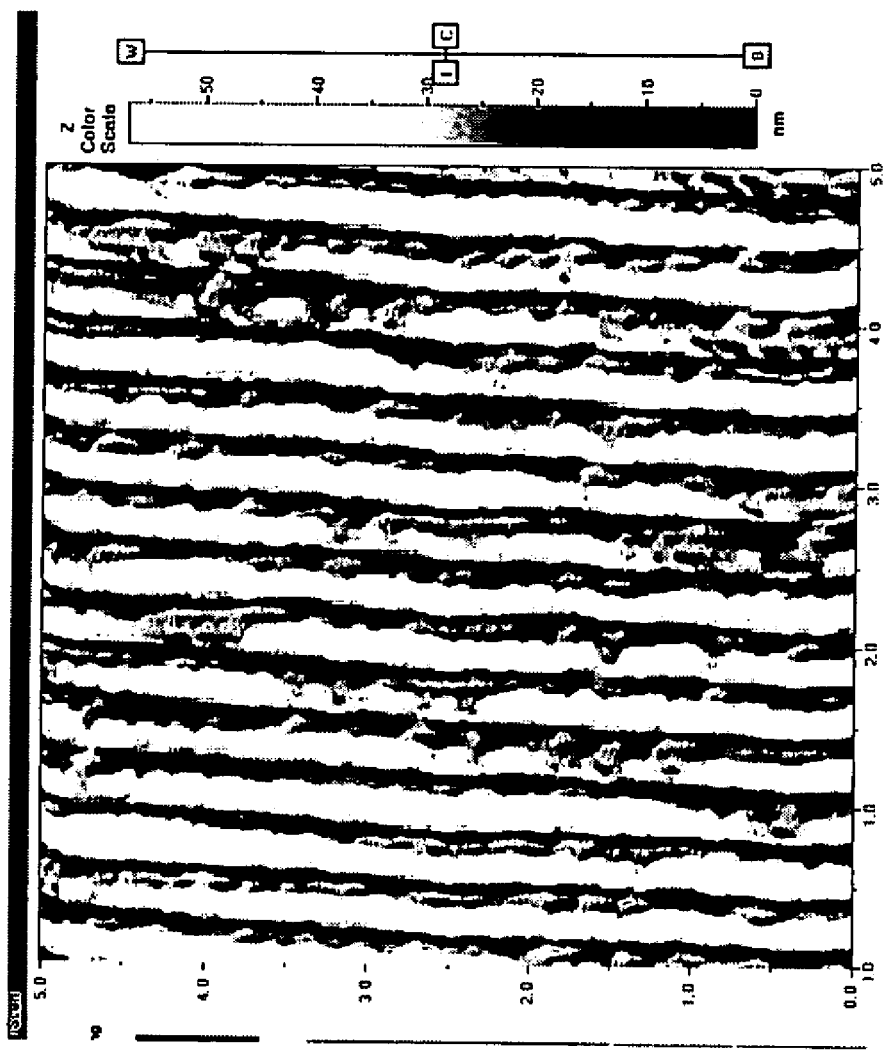

FIGS. 11 and 12 illustrate 10 bilayers PTOPDT-Poly S-119 on a guided mode resonance filter (GMRF), in accordance with aspects of the invention. FIG. 11 includes two Atomic Force Microscopy (AFM) images. The surface roughness is about 360 nm.

Figure 13:
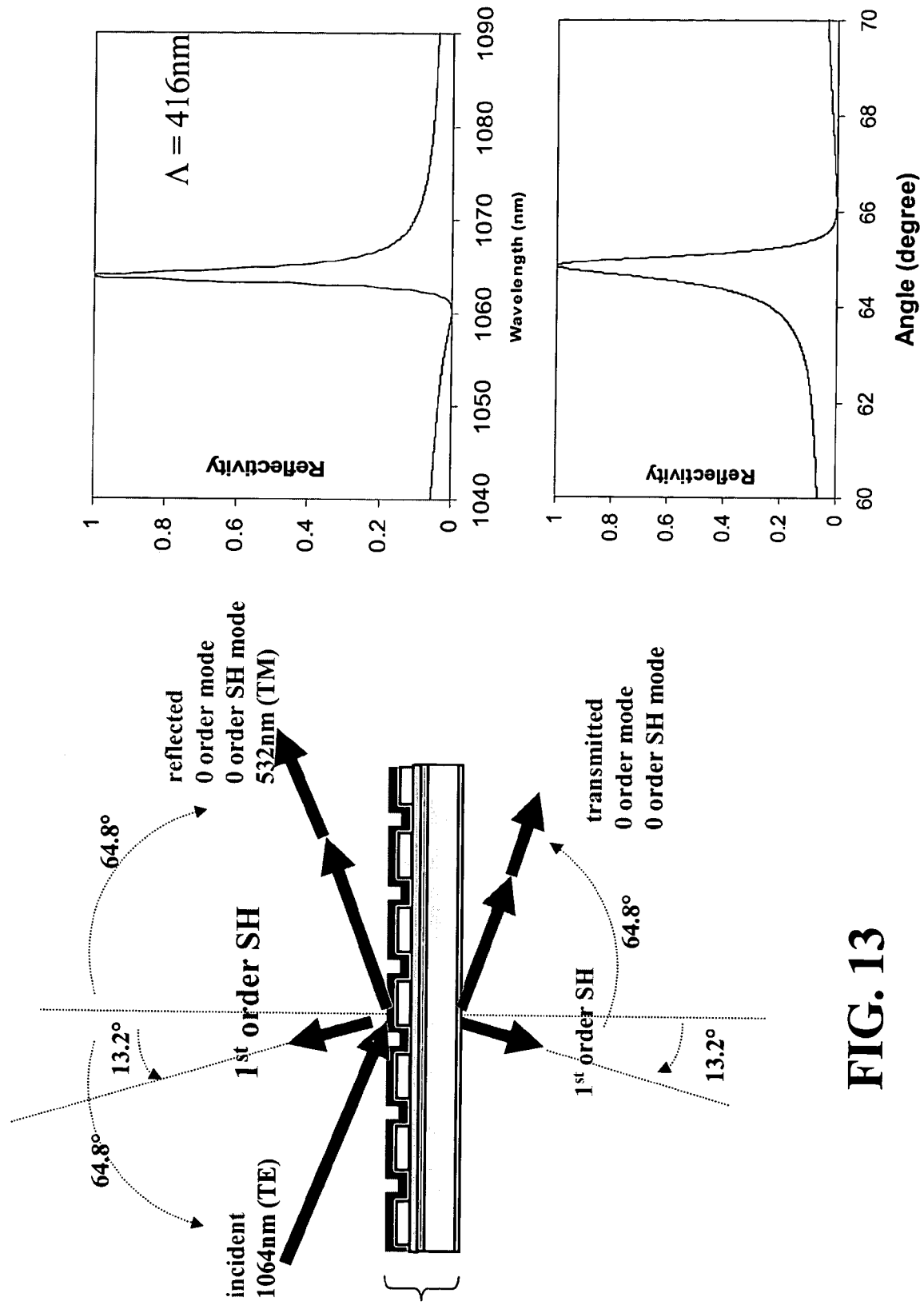
FIG. 13 illustrates calculated resonance data, in accordance with aspects of the invention.

FIG. 13 illustrates calculated resonance data, in accordance with aspects of the invention. The structure of FIG. 13 includes 40 bilayers ISAM (90 nm), a $SiO_2$ grating (140 nm), $SiO_2$ (20 nm), $HfO_2$ (195 nm), and a fused silica substrate (see, e.g., FIG. 15).

Figure 14:
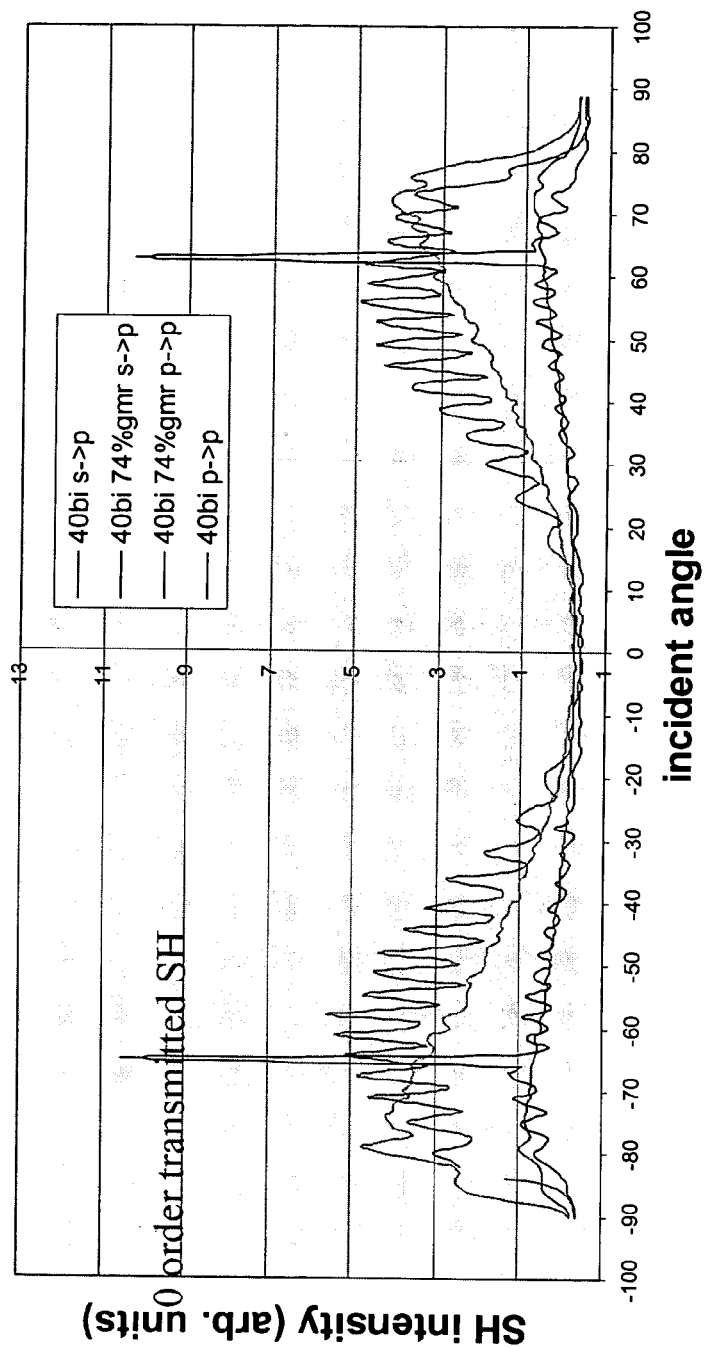
FIG. 14 illustrates experimental results of a Maker fringe pattern of nonlinear GMRF vs. planar film, in accordance with aspects of the invention.
Figure 14:
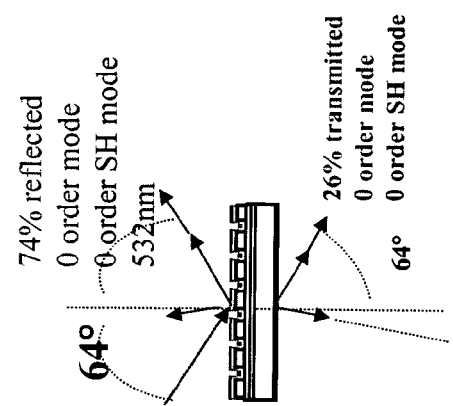

FIG. 14 illustrates experimental results of a maker fringe pattern of nonlinear GMRF vs. planar film, in accordance with aspects of the invention. For FIG. 14 at 1064 nm: 74% reflectance @ 64 degrees incident angle, and $\Lambda$=416 nm.

Figure 15:
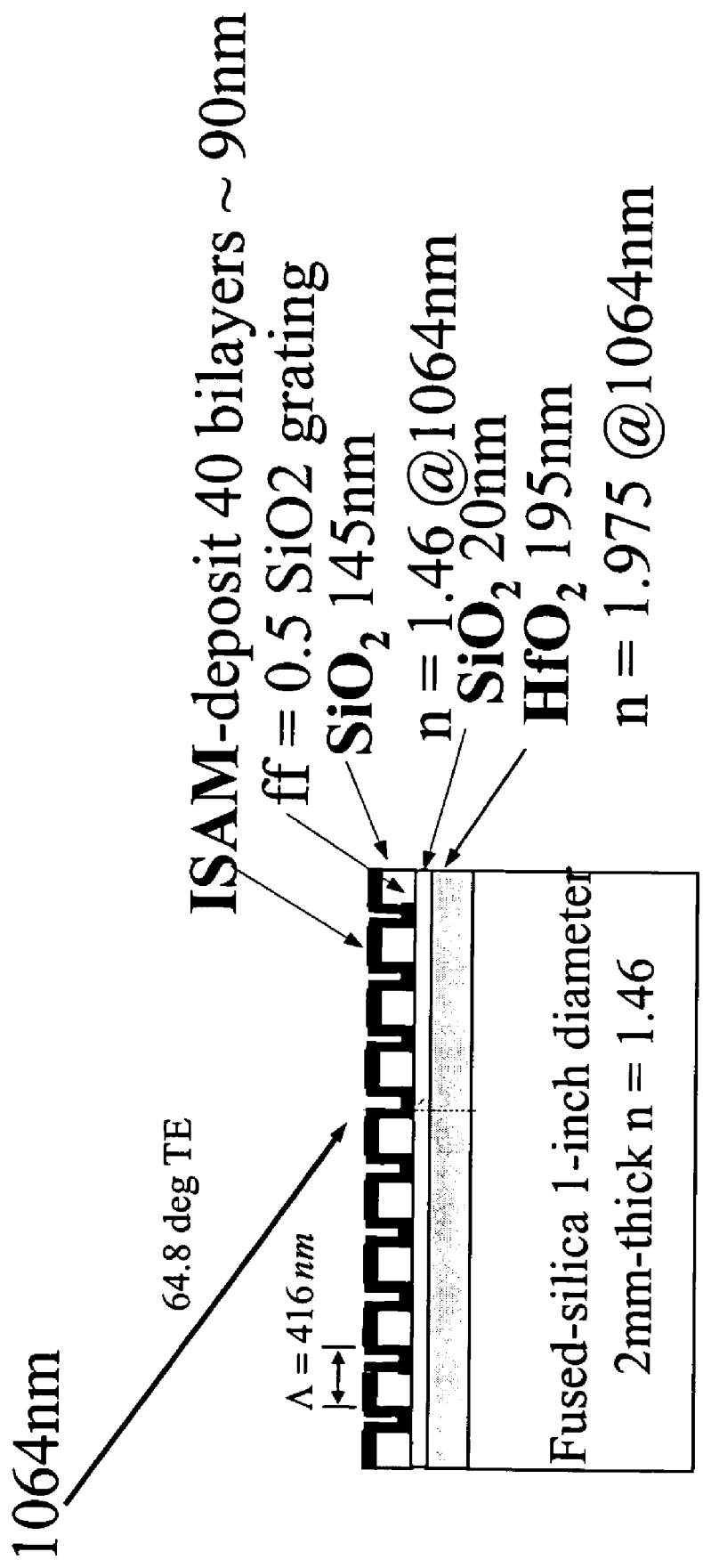
FIGS. 15 and 16 illustrate nonlinear optical filters, in accordance with aspects of the invention.
Figure 16:
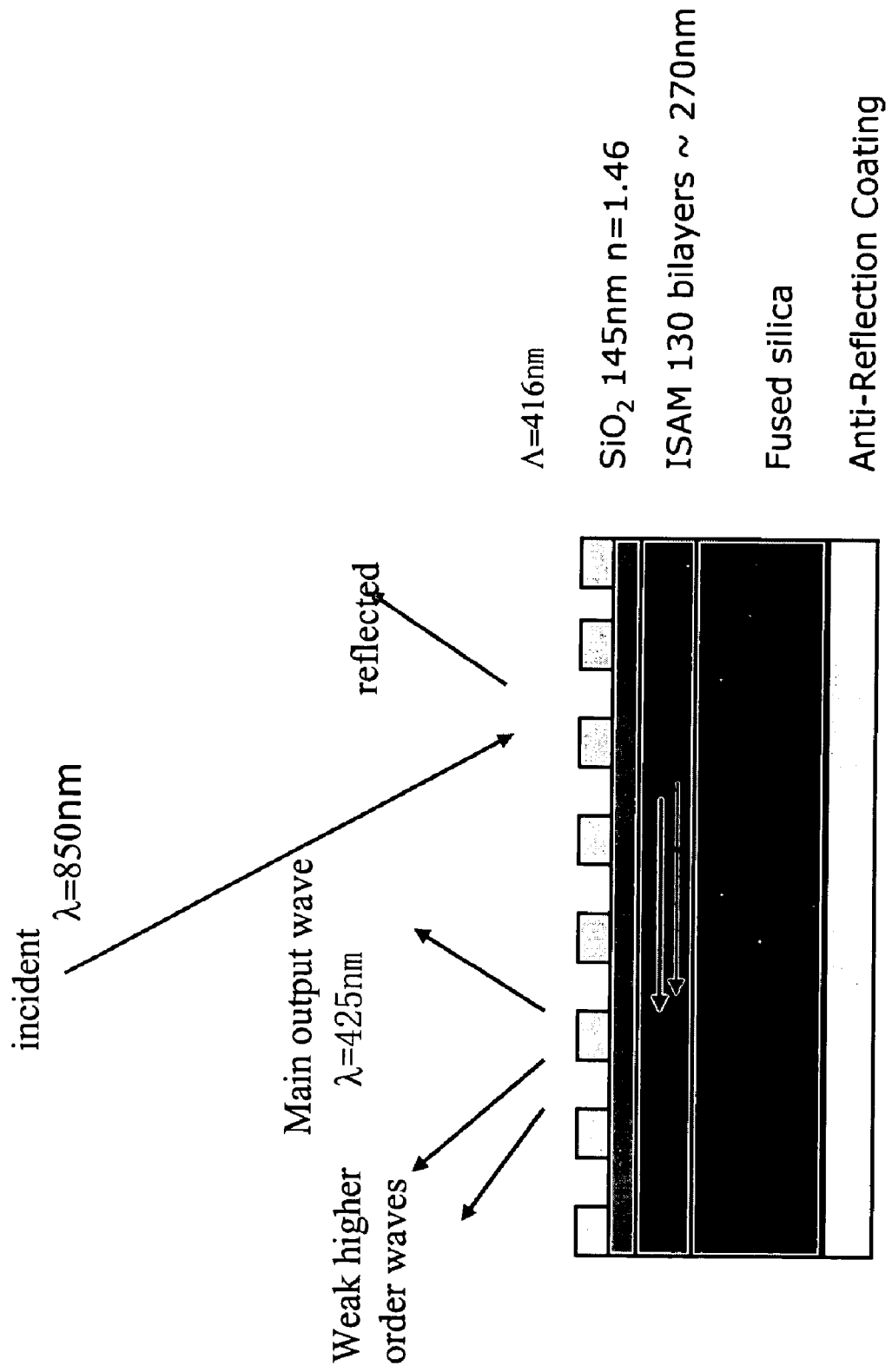
Figure 17:
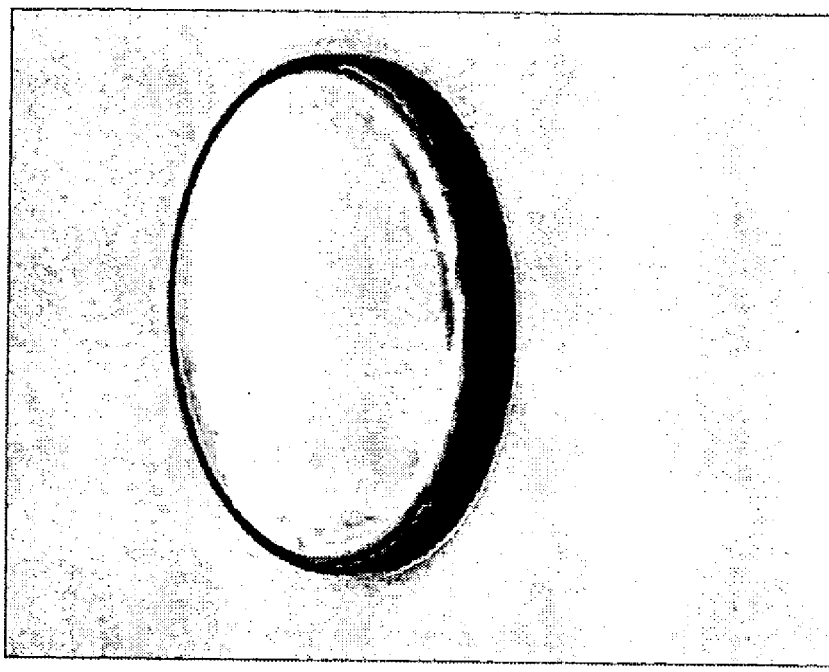
FIG. 17 illustrates the filter of FIG. 15, in accordance with aspects of the invention.

FIGS. 15 and 16 illustrate nonlinear optical filters, in accordance with aspects of the invention. FIG. 15 shows a nonlinear optical filter including a hafnium dioxide layer; a silicon dioxide layer coupled to the hafnium dioxide layer; a silicon dioxide grating coupled to the silicon dioxide layer; and a dye-doped polymer layer coupled to the grating. The dimensions listed in FIG. 15 are exemplary only and do not limit this invention. Further, the arrangement (and composition) of the different layers may vary, as will be understood by those of ordinary skill in the art having the benefit of this disclosure. The filter of FIG. 15, in accordance with aspects of the invention, is shown in FIG. 17. FIG. 16 shows a nonlinear optical filter including a dye-doped polymer layer; a silicon dioxide layer coupled to the dye-doped polymer layer; and a silicon dioxide grating coupled to the silicon dioxide layer. As with FIG. 15, the dimensions listed in FIG. 16 are exemplary only and do not limit this invention. Further, the arrangement (and composition) of the different layers may vary, as will be understood by those of ordinary skill in the art having the benefit of this disclosure.

Figure 18:
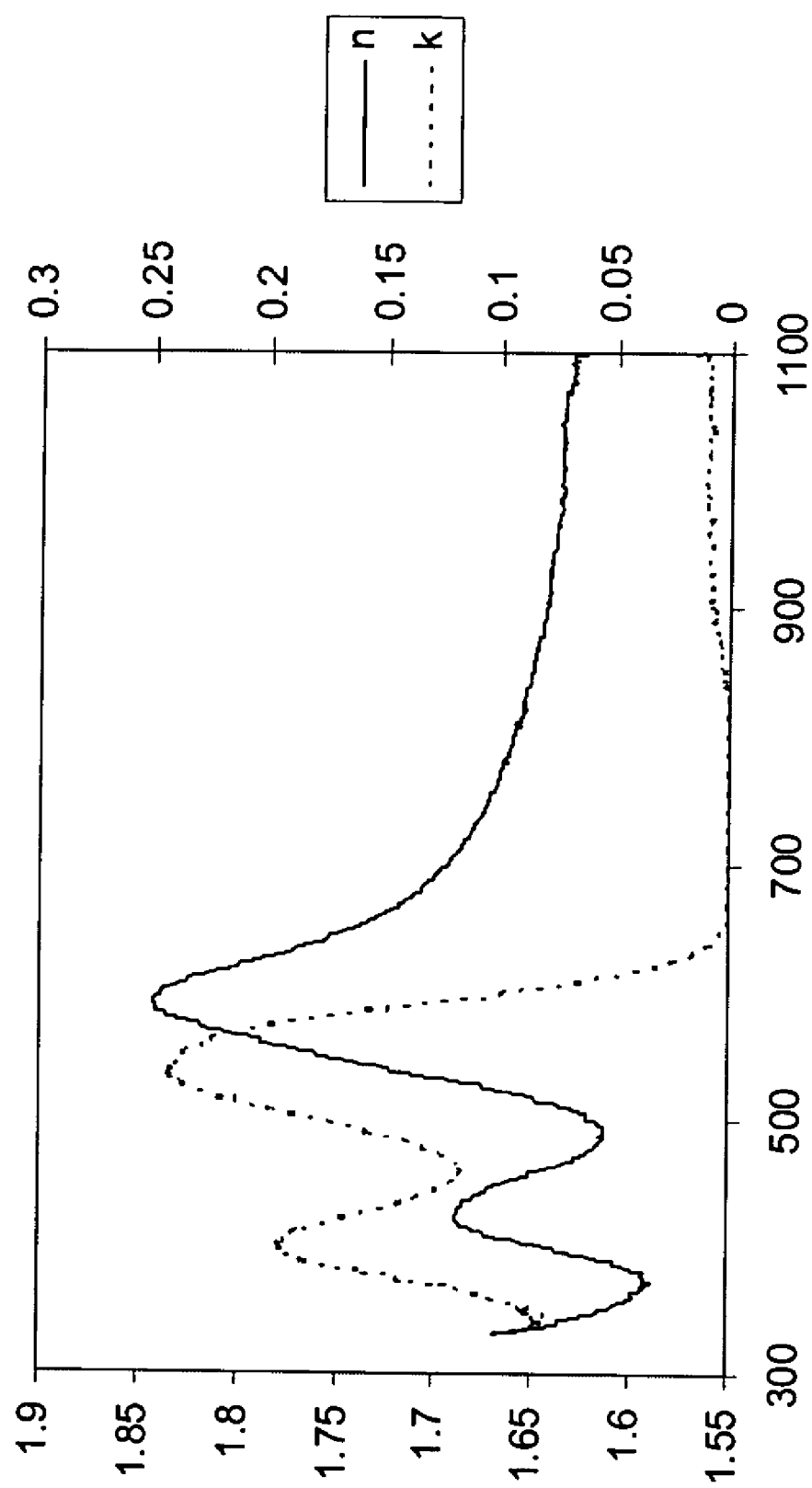
FIG. 18 illustrates optical constants of a 50-bilayer film of PTOPDT/Poly S-119 to implement anomalous-dispersion phase matching (ADPM) for a fundamental wavelength near 922 nm with second-harmonic near 461 nm, in accordance with aspects of the invention.

FIG. 18 illustrates optical constants of a 50-bilayer film of PTOPDT/Poly S-119 to implement anomalous-dispersion phase matching (ADPM) for a fundamental wavelength near or around 922 nm with second-harmonic near or around 461 nm, in accordance with aspects of the invention. FIG. 18 is explained in conjunction with the Examples below.

Figure 19:
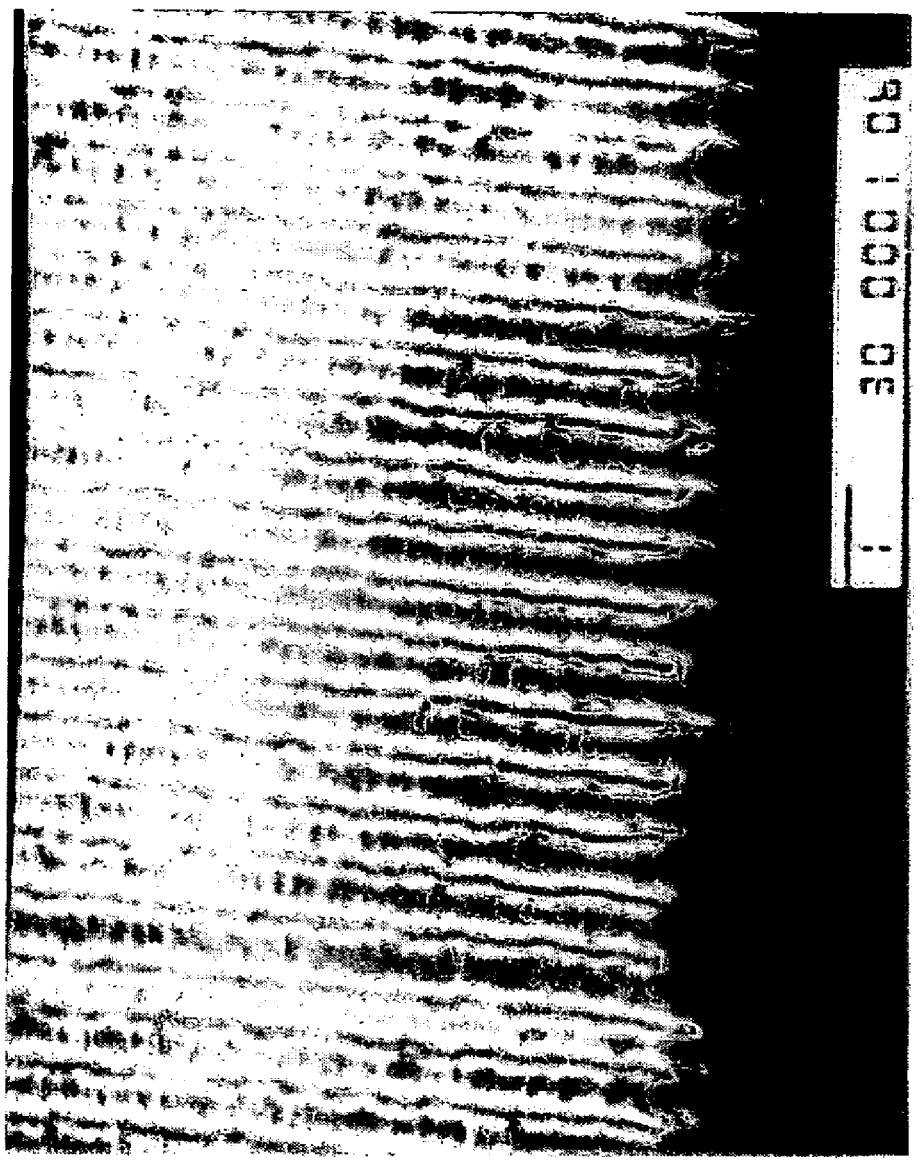
FIG. 19 is an SEM micrograph of a 25-bilayer PTOPDT/PSS film on a fused silica grating, in accordance with aspects of the invention.

FIG. 19 is an SEM micrograph of a 25-bilayer PTOPDT/PSS film on a fused silica grating, in accordance with aspects of the invention. FIG. 19 is explained in conjunction with the Examples below.

Figure 20:
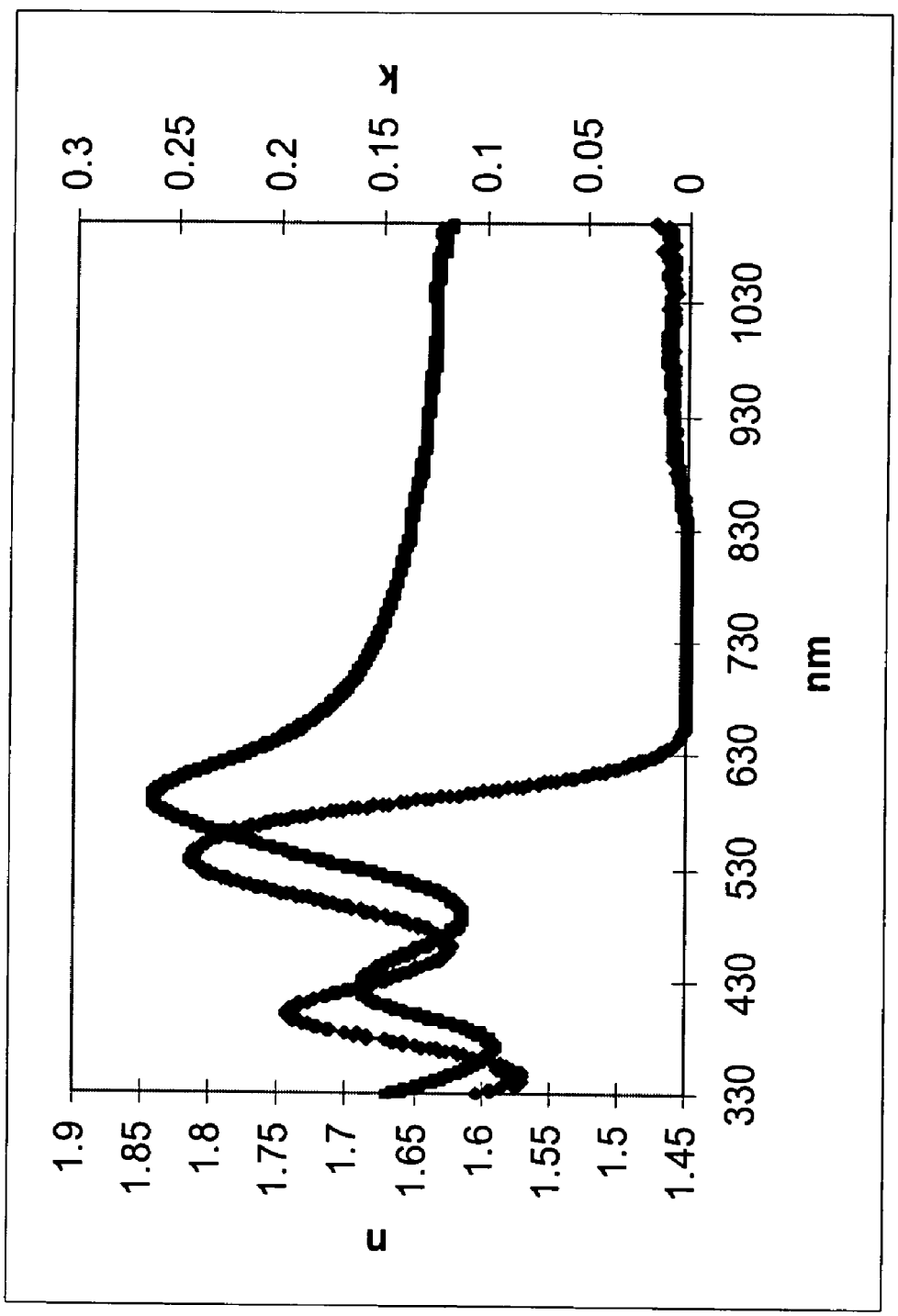
FIG. 20 is a dispersion curve for 50 bilayers PTOPDT/PS119, in accordance with aspects of the invention.

FIG. 20 is a dispersion curve for 50 bilayers PTOPDT/PS119, in accordance with aspects of the invention. FIG. 20 is explained in conjunction with the Examples below.

With the benefit of the present disclosure, those having skill in the art will comprehend that techniques claimed herein and described above may be modified and applied to a number of additional, different applications, achieving the same or a similar result. The claims attached hereto cover all such modifications that fall within the scope and spirit of this disclosure.

EXAMPLES

The following examples are included to demonstrate specific embodiments of this disclosure. It should be appreciated by those of skill in the art that the techniques disclosed in the examples that follow represent techniques discovered by the inventors to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

Example 1

Growth of Monolayered Organic Films for Nanostructured Nonlinear Photonic Devices Organic films, prepared by the ionic self-assembled monolayer technique and deposited on periodic substrates, exhibit smooth surface morphology and anomalous dispersion phase matching suitable for nanostructured nonlinear photonic devices.

The layer-by-layer ionic self-assembled-monolayer (ISAM) method is useful for development of organic materials for photonic device applications. Research on organic films prepared by this method, including absorption and second harmonic (SH) measurements, has been reported. The current work is motivated by integrating organic films into resonant periodic structures yielding new, efficient nonlinear photonic devices. Several types of organic films have been prepared using the ISAM method; in this example we report results obtained with films known in abbreviated, standard form as PDDA/Poly S-119, PTOPDT/PSS, and PTOPDT/Poly S-119.

As an example, the optical properties and film morphology of these ISAM films are summarized in Table 1. The film thickness, refractive index, and extinction coefficient were measured using a spectroscopic ellipsometer. The surface morphology was analyzed with an atomic force microscope. The PDDA/Poly S-119 combination shows good surface morphology with surface roughness root-mean square (RMS) of 3~4 nm when the film thickness is ~200 nm. With high PTOPDT-content methanol solutions, it is difficult to grow smooth PTOPDT/PSS films. By diluting the original saturated PTOPDT and PSS solution, 100 bilayers of PTOPDT/PSS were deposited with reduced surface roughness. Of key importance for wavelength conversion, both PDDA/Poly S-119 and PTOPDT/PSS films exhibit anomalous dispersion phase matching (ADPM) at thickness ~100 nm at wavelengths and parametric values indicated in the table. The spectral variations of the optical constants of a 50-bilayer PTOPDT/Poly S-119 film are shown in FIG. 18.

TABLE 1

Measured Optical and Morphology Parameters of Organic Films

| Polycation/Polyanion | PDDA/Poly S-119 | | | PTOPDT/PSS | | | PTOPDT/Poly S-119 | | |
|---|---|---|---|---|---|---|---|---|---|
| Number of bilayers | 25 | 50 | 100 | 25 | 50 | 100 | 25 | 50 | 100 |
| RMS roughness (nm) | 2.8 | 3.7 | 5.9 | 4.3 | 11.8 | 30.7 | 2.1 | 2.6 | 5.4 |
| Thickness (nm) | 115 | 224 | — | 78 | 139 | — | 45 | 61 | 95 |
| ADPM | | | | | | | | | |
| $\lambda_1$ | 345 | — | — | 420 | 433 | — | — | 461 | — |
| $\lambda_2$ | 790 | — | — | 840 | 866 | — | — | 922 | — |
| n | 1.64 | — | — | 1.62 | 1.65 | — | — | 1.64 | — |
| $k_1$ | 0.0032 | — | — | 0.099 | 0.337 | — | — | 0.115 | — |
| $k_2$ | 0.0045 | — | — | 0.007 | 0.000 | — | — | 0.008 | — |

Films of PTOPDT/PSS have been deposited on a variety of fused silica periodic structures fabricated with holographic lithography and reactive ion etching. For example, FIG. 19 shows a grating structure with period 583 nm and 25-bilayer PTOPDT/PSS film; the ISAM film is shown to be uniform and conformal to the grating surface. Good results with 50-bilayer PTOPDT/PSS films on submicron-period gratings have also been obtained.

In conclusion, numerous organic films have been grown on finely patterned substrates for potential applications in nonlinear photonic devices. For example, films with Poly S-119 polyanions display good surface morphology. PDDA/Poly S-119 and PTOPDT/Poly S-119 exhibit ADPM. PTOPDT/PSS is also promising for ADPM, but it may be advantageous (although not necessary) to even further improve surface quality. Further, many different combinations of anionic and cationic polymers can be used. For example one or both the polymers may have a non-zero second order hyperpolarizability such that when deposited systematically in an ordered fashion on a planar or periodically patterned dielectric, the resultant polymer film will have a macroscopic nonlinear response. Other layer-by-layer films, e.g., Langmuir-Blodgett film, or electrically poled polymer films may be used and may result in different characteristics in surface morphology and optical properties, but will exhibit a macroscopic nonlinear response.

Example 2

ISAMs: Fabrication and Characterization of Planar Waveguide Nonlinear Devices

Waveguides were fabricated for nonlinear optical devices by spin-coating or dip-coating alternating layers of three derivatives of pyrylium-based cationic and anionic solutions on planar substrates. The pyrylium salt chormophores are incorporated into a polymer host having a natural molecular alignment perpendicular to the charged substrate. The self alignment of each subsequent layer provides the noncentrosymmetry required for $\chi^{(2)}$ processes, with $\infty$ mm symmetry, as well as superior hardness and thermal stability. The monolayer assembly process typically creates surface roughness features detrimental to waveguide processes, thus characterization of surface features and development of processes and materials that mitigate these features is important. It is noted that some ISAM combinations perform better than other and may mitigate the surface roughness features.

This example presents combinations of bilayer assembly and compares the physical characteristics of each. The magnitude of the d31 and d33 nonlinearity is determined by Maker fringe measurements and each planar waveguide is assessed for its potential ADPM-SHG conversion efficiency by the nonlinearity magnitude and the ability to make optical quality films. The materials and fabrication processes producing the smoothest and highest nonlinearity film are summarized.

ISAM Assembly

Glass substrates were cleaned and treated to incur a negative charge as described by M. Pomerantz, T. Maldonado, T. Black, D. H. Johnson, L. K. Waller, G. Purvinis, M. R. Sudduth, "Ionic self-assembled thin films for second order NLO applications," Polym. Prepr. (Am. Chem. Soc., Div. Polym. Chem.), 43(2) 562–563, (2002). Films were deposited by either dipping into the cationic/anionic solution for monolayer self-assembly or spin-coated per Table 2. The process is repeated until sufficient layers and film thickness has formed. Monolayers are PTOPDT(poly {terephthaloyl-4-{4-[N,N-bis(2-oxyethylene)amino]phenyl}-2,6-diphenylpyrylium tetrafluoroborate}), PSS (poly(sodium 4-styrenesulfonate)), PDDA poly(diallyldimethylammonium chloride), PolyA-133 (Poly{{disodium 4-amino-5-hydroxy-6-[(4-vinylsulfamoyl)phenyl]azo}naphthalene-1,3-disulfonate}}), and PS119(Poly{{sodium 6-hydroxy-5-[(4-vinylsulfamoyl)phenyl)]azo}naphthalene-2-sulfonate}).

ISAM Characteristics

Table 2 summarizes the structures characterized and resulting physical and optical properties. For each structure, atomic force microscopy (AFM) images were obtained and analyzed to determine the RMS and peak deviation of the height of the features of the characteristic rough surface. Refractive indices, extinction coefficients, and film thicknesses were measured using variable angle spectroscopic ellipsometry. For guided ADPM-SHG, effective index phase matching occurs at 425–480 nm, coinciding with absorption minima, as shown in FIG. 20. The nonlinear dij-coefficients were calculated using measured second harmonic intensity from the sample compared to that of a reference y-cut quartz, using a Q-switched Nd:YAG laser at 1064 nm.

TABLE 2

Comparison of Representative ISAM Characteristics

| cationic/ anionic solution | # of bilayers deposited | deposition method | RMS roughness (nm) | Peak-peak roughness (nm) | thickness/ bilayer nm | n @ λ | n + ik @ λ/2 | $d_{31}$, $d_{33}$ pm/V @ 532 nm |
|---|---|---|---|---|---|---|---|---|
| PTOPDT/ PSS | 25 | ISAM | 2.9 | 70.9 | 2.51 | 1.6510@ 850 nm | 1.6553 + i0.0700 | 1.9, 5.6 |
| PTOPDT/ PSS | 50 | ISAM | 11.8 | 118.1 | 2.19 | 1.6530@ 850 nm | 1.6150 + i0.0800 | — |
| PDDA/ PolyA-133 | 25 | spin | 3.6 | 44.3 | 2.44 | 1.5955@ 920 nm | 1.5891 + i0.0039 | <<ISAM |
| PDDA/ PolyA-133 | 50 | Spin | 10.9 | 84.2 | 2.84 | 1.6199@ 920 nm | 1.5682 + i0.0710 | <<ISAM |
| PTOPDT/ PolyS-119 | 25 | ISAM | 2.1 | 21.5 | 1.80 | 1.6220@ 934 nm | 1.5884 + i0.0973 | 0.9, 1.0 |
| PTOPDT/ PolyS-119 | 50 | ISAM | 2.6 | 25.9 | 1.22 | 1.6420@ 922 nm | 1.6441 + i0.1149 | 0.30, 1.2 |
| PTOPDT/ PolyS-119 | 100 | ISAM | 5.4 | 61.4 | 1.90 | 1.6417@ 958 nm | 1.729 + i0.2680 | 0.5, 1.9 |

In another example, a combination spin-coating method of deposition can be used to produce smoother surfaces compared to ISAM. However, the spin-coating method displays an order of magnitude reduction in nonlinearity, possibly due to rotational stress. As such, for both methods of deposition, roughness is proportional to thickness and other efforts can concentrate on combining highly nonlinear ISAM with spin-coated surface layers. For example, theoretical high conversion efficiency for ADPM-SHG is possible with these ISAM structures.

Example 3

Second-harmonic Generation in Resonant Waveguide Gratings Incorporating

ISAM Polymer Films

Organic materials are used in various applications such as second-harmonic generation (SHG) due, in part, to their potential nonlinear coefficients. Polymer films grown by an ISAM technique are beneficial as the films require no poling and are mechanically and thermally stable. Further, ISAM techniques provide for tailoring uniformly the nonlinearity and noncentrosymmetry throughout the thickness of the films, even on nonplanar surfaces such as gratings. These polymeric films exhibit anomalous dispersions which may be applied to realize effective phase matching between the fundamental wave and its second harmonic.

The basis for guided-mode resonance filters (GMRF) arises in waveguide gratings, as the external input wave is phase-matched, via the periodic element, to a leaky waveguide mode, producing a sharp reflection peak. At resonance, the input beam energy density is concentrated in the waveguide-grating layers with a local field enhancement that is substantially proportional to the inverse of the modulation amplitude. As such, when a $\chi$ nonlinear layer is integrated into the structure, frequency doubling is facilitated.

In this example, a functional device is fabricated which consists of a polymeric ISAM nonlinear $\chi$ thin film integrated into a GMRF-type structure. A pyrylium-based polymer, described below, is deposited by the ISAM technique onto a two-layer dielectric GMRF-type structure, and its nonlinear optical response is recorded by the Maker fringe method.

Figure 21:
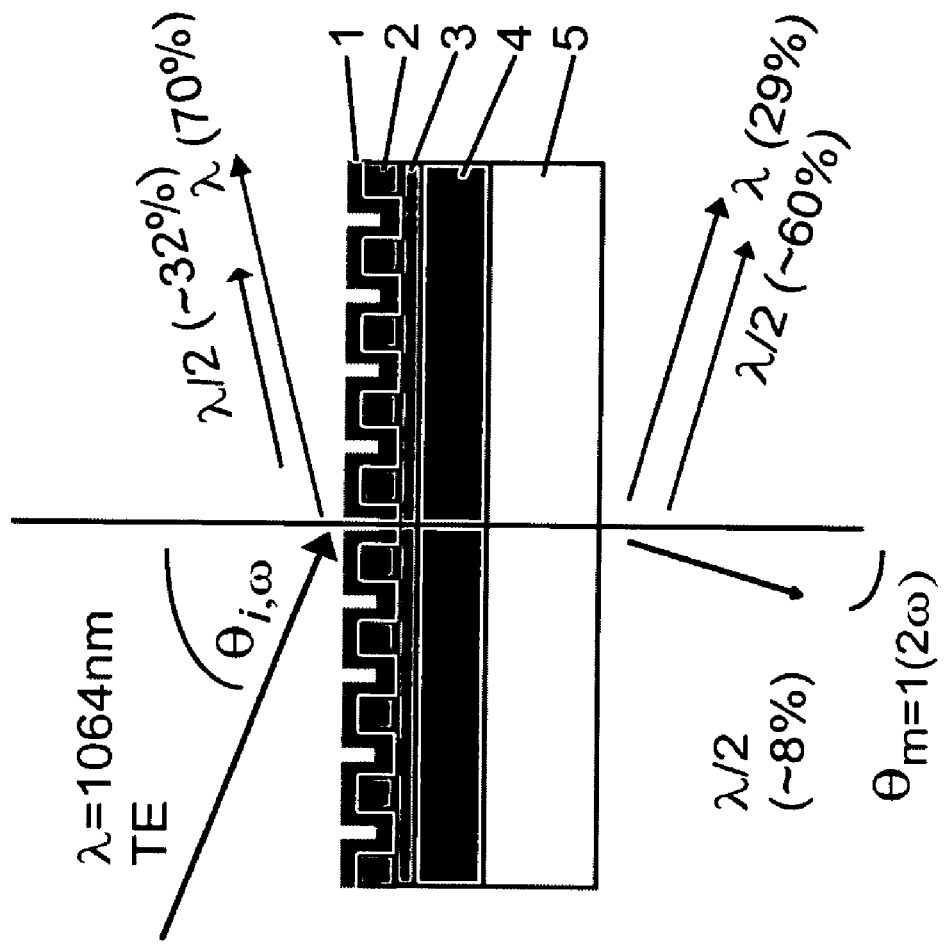
FIG. 21 is a nonlinear-organic guided-mode resonance filter (GMRF), in accordance with aspects of the invention.

FIG. 21 shows the structure of the dielectric GMRF with the polymeric ISAM film deposited on the surface of a $SiO_2$ grating. The surface-relief $SiO_2$ grating is placed on top of an $HfO_2$ homogeneous waveguide layer on a fused-silica substrate. The $SiO_2$ grating is obtained by a series of steps including holographic recording of a photoresist grating with an Ar UV laser ($\lambda$=364 nm), deposition of a thin film of Cr on top of the photoresist grating, lift-off of the photoresist grating, and subsequent reactive-ion etching of the masked $SiO_2$ layer with $CF_4$. A UV-absorbing layer is deposited between the photoresist layer and the $SiO_2$ layer to reduce back reflection noise during recording of the photoresist grating.

Figure 22A:
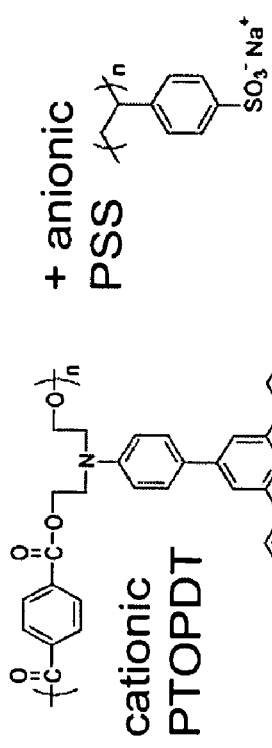
FIG. 22 illustrates materials for fabricating nonlinear organic films and dispersion curves of a resultant film to implement SHG by ADPM, in accordance with aspects of the invention.
Figure 22B:
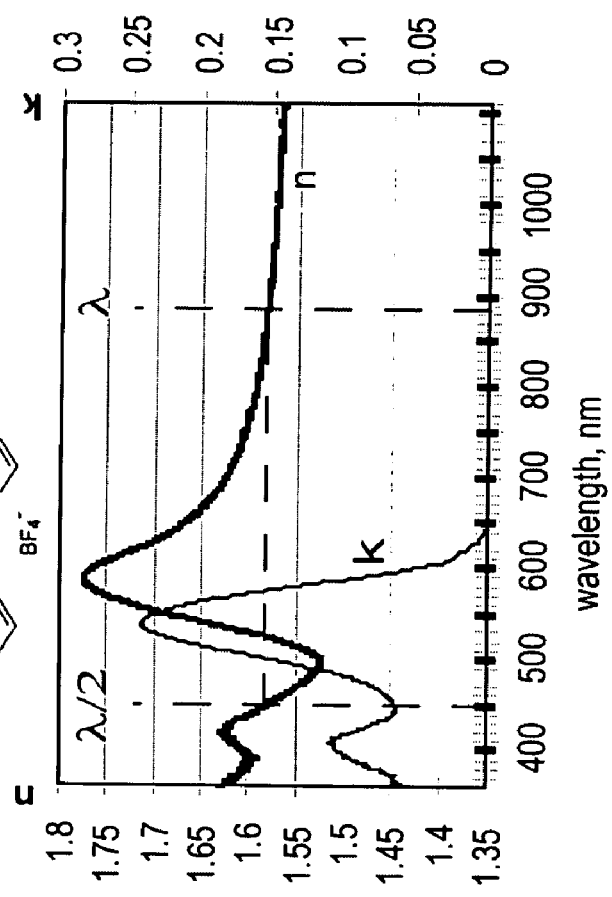

FIG. 22 shows the dispersion curve, measured with a spectroscopic ellipsometer, of the cationic dye-containing polymer, poly{terephthaloyl-4-{4-[N,N-bis(2-oxyethylene)amino]phenyl}-2,6-diphenylpyrylium tetrafluoroborate} (PTOPDT) and the anionic poly(sodium 4-styrenesulfonate) (PSS) that together form the ISAM film. Prior to film deposition, negative surface charge is induced on the grating surface by dipping the GMRF in a solution of 5:1:2 DI water: 30% $H_2O_2$: $NH_4OH$ for 60 minutes and then rinsing with DI water. The bilayers are fabricated by dipping the surface charged GMRF into a saturated solution of PTOPDT in methanol for 4 min., rinsing with DI water for 3 min., dipping into a solution of PSS in water for 4 min., and finally rinsing with DI water for 3 min. These steps produce a single bilayer on both sides of the GMRF structure. The alternating dipping procedure is then repeated, using a robotic system, to grow films, layer by layer, to the desired thickness. Once the film is grown, the bilayers deposited on the device backside are removed.

Figure 23:
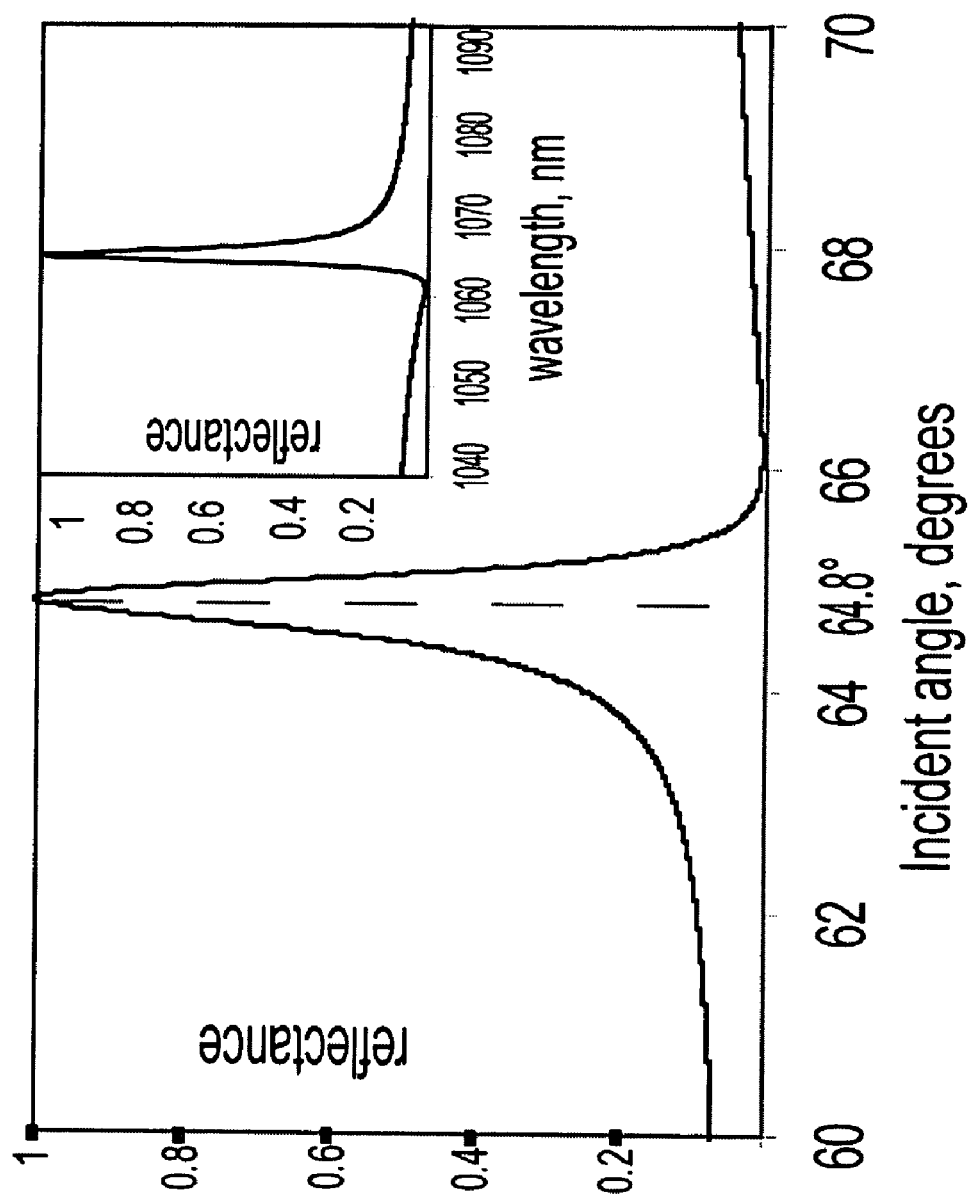
FIG. 23 illustrates angular and spectral (inset) resonance, in accordance with aspects of the invention.

Rigorous coupled-wave analysis is used to design the NLO-GMRF device. Plots of the spectral and angular device response indicate that at a fundamental wavelength of 1064 nm and for TE input polarization, resonance occurs at $\theta_i$=64.8° are shown in FIG. 23. Experimentally, the resonance is verified by measuring the 1064 nm power reflected as well as the power transmitted. The fabricated device exhibits 70% reflectance and 29% transmittance of the resonant fundamental with an incident power of 2.67 W average from a pulsed Nd:YAG laser (13 ns pulse width, 20 pps) and an incident angle of $\theta_i=64°$. Reduced resonance efficiency may be ascribed to grating imperfections, scattering, and imperfect beam collimation; however the device clearly exhibits linear resonant behavior.

Figure 24:
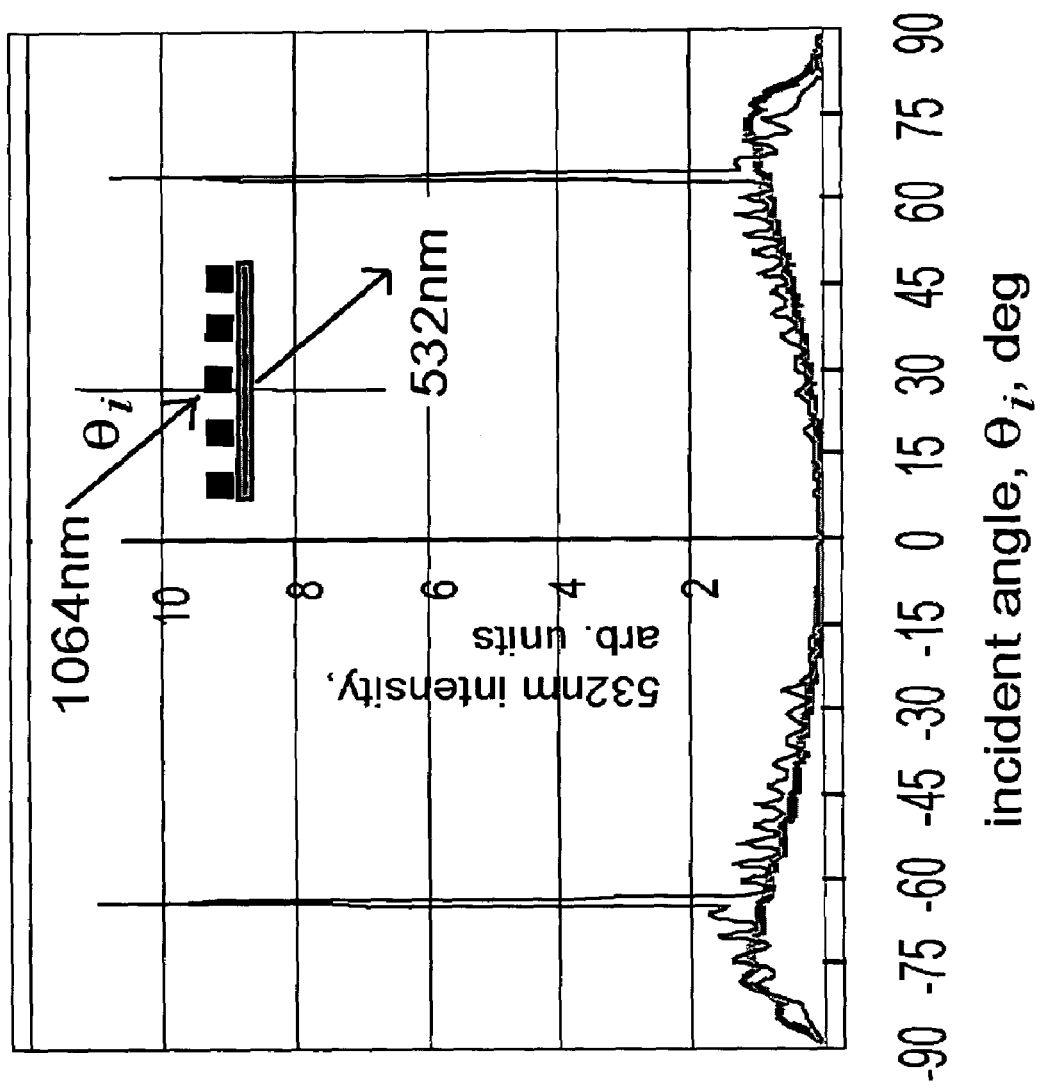
FIG. 24 shows a plot angular variations showing second-harmonic power, in accordance with aspects of the invention.

To determine the NLO performance, the NLO-GMRF device, and a planar reference sample comprising 40 bilayers PTOPDT-PSS deposited on a glass slide is tested in a rotational Maker fringe experiment. Since these devices are not designed to be phase-matched for efficient SHG, the Maker fringe technique provides a sensitive method to test the devices under resonant and non-resonant conditions. The results shown in FIG. 24 indicate that at the resonant angle of incidence of $\theta_i=64°$, a 9-fold increase in second-harmonic power is observed in the transmission direction over that generated at either a non-resonant incident angle or by the planar 40 bilayer device.

In these experiments, the 532 nm second harmonic (SH) is simply excited by the concentrated energy density of the TE-polarized fundamental at 1064 nm wavelength. The measured directions of the experimentally observed second-harmonic waves and their relative power distribution are indicated in FIG. 21. These directions can be calculated by the classical diffraction grating equation. For the device of this example, the grating equation with $\theta_i=-64.4°$ yields $\theta_{1,2\omega}=-19.1°$ and $\theta_{2,2\omega}=65.5°$ and experimentally $\theta_{1,2\omega}=-19.5\pm2°$ and $\theta_{2,2\omega}=64\pm2°$, where $\theta_{m,2\omega}$ is the diffraction angle of the $m^{th}$ diffracted order (m=1,2) of the SH. The measured conversion efficiency of the zeroth transmitted order for this resonant, but non-phase-matched, device is $\eta=P_{2\omega}/(P_\omega)^2=1.35\times10^{-8}\%/W$. The measured SH is TM polarized, as expected due to the non-zero elements of the d-tensor for ISAM films with $\infty$ mm symmetry. For this particular device, resonance is not possible at any incident angle with a TM polarized fundamental, and TE SH output is not possible due to the zeros in the d-tensor.

The dispersion curve of FIG. 22 indicates that the second harmonic is produced at a wavelength (532 nm) that is highly absorbing. To improve the conversion efficiency, future devices will be designed for anomalous dispersion phase-matched (ADPM) SHG in the low loss blue window between 425–460 nm, thus both decreasing loss and increasing coherence length for phase matching. ADPM could decrease the present refractive index difference from $\Delta n=n_{2\omega}-n_\omega=0.08$ at $\lambda=1064$ nm to $\Delta n=0.01$ or less at $\lambda=850$ nm, thereby increasing conversion efficiency by a factor of 100 or more.

In conclusion, nonlinear conversion enabled by the GMR effect in NLO ISAM films on GMRF structures is realized experimentally and found to exhibit a factor of 9 increase in SHG in the zeroth transmitted order. SHG waves propagating in the specular reflection direction and in the first diffracted order are also observed.

With the benefit of the present disclosure, those having skill in the art will comprehend that techniques claimed herein may be modified and applied to a number of additional, different applications, achieving the same or a similar result. The claims attached hereto cover all such modifications that fall within the scope and spirit of this disclosure.

REFERENCES

Each of the Following References is Hereby Incorporated by Reference in its Entirety:

U.S. Pat. No. 6,020,175
U.S. Pat. No. 6,154,480
U.S. Pat. No. 5,598,300
U.S. Pat. No. 5,216,680
Blau et al., *Optics Letters*, 18:1352–1354, 1993.
Blau et al., *Optics Letters*, 20:1101–1103, 1995.
Chen and Simon, *Optics Letters*, 13:1008–1010, 1988.
Cheng and Guo, *J. Vac. Sci. Technol. B*, 19(6):2736–2740, 2001.
Dai et al., *J. Opt. Soc. Am. B.*, 17:12–421, 2000.
Dawson et al., *J. Am. Chem. Soc.*, 98:5996–6000, 1976.
Dawson, *Aldrichimica Acta*, 14(2):3–29, 1981.
Decher et al., *Thin Solid Films*, 210/211:831–835, 1992.
Decher et al., *Thin Solid Films*, 210:831–835, 1992.
Gaylord and Moharam, *Proc. IEEE*, 73:894–937, 1985.
Heflin et al., *Appl. Phys. Lett.*, 74:495–497, 1999.
Hessel and Oliner, *Applied Optics*, 4: 1275–1298, 1965.
Jerphagnon and Kurtz, *J. Appl. Phys.*, 41:1667–1681, 1970.
Kull et al., *Optics Letters*, 16:1930–1932, 1991.
Magnusson et al., In: *Nano- and Micro-Optics for Information Systems*, Eldada (Ed.), Proc. SPIE 5225:20–34, 2003.
Maker et al., *Phys. Rev. Lett.*, 8:21–22, 1962.
Pomerantz et al., *Am. Chem. Soc.*, 43(2):562–563, 2002.
Pomerantz et al., *Am. Chem. Soc., Div. Polym. Chem.*, 43(2):562–563 (2002).
Priambodo et al., *Applied Physics Letters*, 83:3248–3250, 2003.
Purvinis et al, *Optics Letters*, 29(10):1108–1110, 2004.
Reinisch et al., *Optics Comm.*, 112:339–438, 1994.
Shin et al., *Opt. Eng.*, 37:2634–2664, 1998.
Sudduth et al., *Trends in Optics and Photonics Series*, 64:14–19, 2002.
Wang and Magnusson, *Applied Optics*, 32:2606–2613, 1993.
Wang and Magnusson, *Applied Optics*, 34:2414–2420, 1995.
Zhang et al., *Optics Communications*, 186:135–141, 2000.

The invention claimed is:

1. An apparatus comprising:
   a nonlinear resonance optical filter comprising:
     a waveguide grating; and
     a nonlinear, organic-film coating coupled to the grating;
     wherein a combination of the grating and the film is configured to operate in a leaky resonant mode.

2. The apparatus of claim 1, where the filter is operable under an anomalous dispersion phase matching condition for increasing an efficiency of a frequency conversion process.

3. An apparatus comprising:
   a nonlinear resonance optical filter comprising:
     a waveguide grating; and
     a dye-containing layer coupled to the grating;
     wherein a combination of the grating and the dye-containing layer is configured to operate in a leaky resonant mode.

4. The apparatus of claim 3, where the dye-containing layer comprises a dye-doped polymer layer.

5. The apparatus of claim 3, where the dye-containing layer comprises ionic self-assembled layers.

6. The apparatus of claim 3, where the filter is operable under an anomalous dispersion phase matching condition for increasing an efficiency of a frequency conversion process.

7. An apparatus comprising:
   a nonlinear resonance optical filter comprising:
     a substrate;
     a grating; and a dye-containing layer between the substrate and the grating;
wherein a combination of the grating and the dye-containing layer is configured to operate in a leaky resonant mode.

8. The apparatus of claim 7, where the dye-containing layer comprising a dye-doped polymer layer.

9. The apparatus of claim 7, where the dye-containing layer comprises ionic self-assembled layers.

10. The apparatus of claim 7, where the filter is operable under an anomalous dispersion phase matching condition for increasing an efficiency of a frequency conversion process.

11. An apparatus comprising:
an optical resonance filter comprising:
an optical waveguide grating; and
one or more nonlinear layers coupled to the grating, any one of the nonlinear layers comprising a dye-containing polymer, a dye-doped polymer, or a dye not associated with a polymer in a layer;
wherein the optical waveguide grating has an appropriate periodicity to generate a leaky waveguide mode, this leaky waveguide mode interacting with the one or more nonlinear layers to produce frequency converted output light for a given input optical beam excitation.

12. The apparatus of claim 11, where any of the one or more nonlinear layers comprises ionic self-assembled layers or non-ionic layers.

13. The apparatus of claim 11, where the dye-doped polymer layer comprises ionic self-assembled layers.

14. The apparatus of claim 11, where the grating comprises a semiconducting material.

15. The apparatus of claim 14, where the grating comprises silicon.

16. The apparatus of claim 14, where the grating comprises gallium arsenide.

17. The apparatus of claim 11, where the grating comprises a dielectric material.

18. The apparatus of claim 17, where the grating comprises silicon dioxide.

19. The apparatus of claim 11, where the dye-doped polymer layer is on the grating.

20. The apparatus of claim 11, further comprising one or more substrate layers coupled to the grating.

21. The apparatus of claim 11, where at least one of the substrate layers comprises hafnium dioxide.

22. The apparatus of claim 21, where the dye-doped polymer layer comprises ionic self-assembled layers.

23. The apparatus of claim 21, where the grating comprises a semiconducting material.

24. The apparatus claim 23, where the grating comprises silicon.

25. The apparatus claim 23, where the grating comprises gallium arsenide.

26. The apparatus of claim 21, where the grating comprises a dielectric material.

27. The apparatus of claim 26, where the grating comprises silicon dioxide.

28. The apparatus of claim 11, where the filter is operable under an anomalous dispersion phase matching condition for increasing an efficiency of a frequency conversion process.

29. An apparatus comprising:
a nonlinear resonance optical filter comprising:
a hafnium dioxide layer;
a silicon dioxide layer on the hafnium dioxide layer;
a silicon dioxide grating on the silicon dioxide layer and a dye-doped polymer layer coupled to a grating;
wherein a combination of the grating and the dye-doped polymer layer is configured to operate in a leaky resonant mode.

30. The apparatus of claim 29, further comprising a fused silica layer below the hafnium dioxide layer.

31. The apparatus of claim 29, where the dye-doped polymer layer comprises ionic self-assembled layers.

32. The apparatus of claim 31, where the hafnium dioxide layer is about 100 nm, the silicon dioxide layer is about 20 nm, the silicon dioxide grating is about 145 nm and has a fill factor of about 0.5, and the ionic self-assembled layers are about 90 nm and comprises about 40 bilayers.

33. The apparatus of claim 29, where the filter is operable under an anomalous dispersion phase matching condition for increasing an efficiency of a frequency conversion process.

34. An apparatus comprising:
a nonlinear resonance optical filter comprising:
a dye-doped polymer layer;
a silicon dioxide layer on the dye-doped polymer layer; and
a silicon dioxide grating on the silicon dioxide layer;
wherein a combination of the grating and the dye-doped polymer layer is configured to operate in a leaky resonant mode.

35. The apparatus of claim 34, where the dye-doped polymer layer comprises ionic self-assembled layers.

36. The apparatus of claim 35, where the ionic self-assembled layers are about 270 nm and comprises about 130 bilayers.

37. The apparatus of claim 34, where the filter is operable under an anomalous dispersion phase matching condition for increasing an efficiency of a frequency conversion process.

38. An apparatus comprising:
a guided-mode resonance filter comprising:
a dielectric diffractive structure; and
a nonlinear, organic-film coating coupled to the dielectric diffractive structure;
wherein the guided-mode resonance filter generates second harmonic light; and
wherein a combination of the diffractive structure and the coating is configured to operate in a leaky resonant mode.

39. The apparatus of claim 38, the dielectric diffractive structure comprising a substantially planar surface.

40. The apparatus of claim 38, the dielectric diffractive structure comprising a non-planar surface.

41. The apparatus of claim 38, the dielectric diffractive structure comprising a silicon dioxide grating.

42. The apparatus of claim 38, the nonlinear, organic-film comprising at least one layer of a polymeric ionic self-assembled monolayer (ISAM) nonlinear thin film.

43. The apparatus of claim 38, the nonlinear, organic-film comprising at least one layer of a polymeric dye-doped material.

44. The apparatus of claim 38, further comprising a fused-silica substrate.

45. The apparatus of claim 44, the fused-silica substrate comprising an $HfO_2$ homogeneous waveguide layer.

46. The apparatus of claim 38, further comprising a UV-absorbing layer.

47. The apparatus of claim 38, where the filter is operable under an anomalous dispersion phase matching condition for increasing an efficiency of a frequency conversion process.

48. A method for nonlinear filtering, comprising:
providing a nonlinear resonance filter comprising a grating and a dye-doped polymer layer coupled to the grating, wherein a combination of the grating and the dye-doped layer is configured to operate in a leaky resonant mode;

directing incident light onto the filter; and collecting filtered light from the filter.

49. The method of claim 48, where the dye-doped polymer layer comprises ionic self-assembled layers.

50. The method of claim 48, where the nonlinear filtering is used under an anomalous dispersion phase matching for increasing an efficiency of a frequency conversion process.

51. A method comprising:

providing a nonlinear resonance filter comprising a grating and a dye-doped polymer layer coupled to the grating, wherein a combination of the grating and the dye-doped polymer is configured to operate in a leaky resonant mode;

directing an input optical wave upon the filter; and backward diffracting the broadband optical wave from the grating as an output narrowband optical wave.

52. The method of claim 51, where the output narrowband optical wave comprises a second harmonic beam.

53. The method of claim 51, where the dye-doped polymer layer comprises ionic self-assembled layers.

54. The method of claim 51, the input optical wave comprising a broadband input optical wave.

55. The method of claim 51, the input optical wave comprising a narrowband input optical wave.

56. The method of claim 51, where the method is used under an anomalous dispersion phase matching for increasing an efficiency of a frequency conversion process.

\* \* \* \* \*